(12) United States Patent
Varanasi et al.

(10) Patent No.: US 12,208,344 B2
(45) Date of Patent: Jan. 28, 2025

(54) FOAM REDUCTION AND/OR PREVENTION METHODS AND ASSOCIATED SYSTEMS AND ARTICLES

(71) Applicant: Massachusetts Institute of Technology, Cambridge, MA (US)

(72) Inventors: Kripa K. Varanasi, Lexington, MA (US); Leonid Rapoport, Redwood City, CA (US)

(73) Assignee: Massachusetts Institute of Technology, Cambridge, MA (US)

( * ) Notice: Subject to any disclaimer, the term of this patent is extended or adjusted under 35 U.S.C. 154(b) by 2 days.

(21) Appl. No.: 17/969,608

(22) Filed: Oct. 19, 2022

(65) Prior Publication Data

US 2023/0149834 A1   May 18, 2023

Related U.S. Application Data

(63) Continuation of application No. 16/955,200, filed as application No. PCT/US2018/066689 on Dec. 20, 2018, now Pat. No. 11,504,651.

(60) Provisional application No. 62/608,394, filed on Dec. 20, 2017.

(51) Int. Cl.
*B01D 19/00* (2006.01)
*B01D 19/02* (2006.01)
*C02F 1/20* (2023.01)

(52) U.S. Cl.
CPC ......... *B01D 19/0042* (2013.01); *B01D 19/02* (2013.01); *C02F 1/20* (2013.01)

(58) Field of Classification Search
CPC ........ B01D 19/0042; B01D 19/02; C02F 1/20
See application file for complete search history.

(56) References Cited

U.S. PATENT DOCUMENTS

| 4,533,569 | A  | 8/1985  | Bangs          |
|-----------|----|---------|----------------|
| 9,713,779 | B2 | 7/2017  | Emkey          |
| 11,504,651 | B2 | 11/2022 | Varanasi et al.|
| 2013/0340840 | A1 | 12/2013 | Anand et al. |

(Continued)

FOREIGN PATENT DOCUMENTS

| JP | S61283311 A | * | 12/1986 |
| WO | 2013/022467 A2 | | 2/2013 |
| WO | 2013/130118 A1 | | 9/2013 |

(Continued)

OTHER PUBLICATIONS

International Search Report and Written Opinion mailed May 1, 2019, for Application No. PCT/US2018/066689.

(Continued)

*Primary Examiner* — Robert A Hopkins
(74) *Attorney, Agent, or Firm* — Wolf, Greenfield & Sacks, P.C.

(57) ABSTRACT

Foam mitigation using a variety of articles, systems, and methods is generally described. According to certain embodiments, surfaces with certain wetting properties can be used to reduce or eliminate the formation of foam from bubble-containing liquids. In some embodiments, a surface with certain wetting properties is configured and/or arranged within bubble-containing liquids such that the surface provides a gaseous fluidic pathway through which gas from the bubbles within the liquid may be channeled to a gaseous environment outside the liquid.

24 Claims, 22 Drawing Sheets

(56) References Cited

U.S. PATENT DOCUMENTS

2015/0037695 A1     2/2015   Ward et al.

FOREIGN PATENT DOCUMENTS

| | | |
|---|---|---|
| WO | 2013/141888 A1 | 9/2013 |
| WO | 2013/141953 A2 | 9/2013 |
| WO | 2013/188702 A1 | 12/2013 |
| WO | 2014/078867 A1 | 5/2014 |
| WO | 2014/134498 A2 | 9/2014 |
| WO | 2015/074077 A1 | 5/2015 |
| WO | 2015/095660 A1 | 6/2015 |

OTHER PUBLICATIONS

International Preliminary Report on Patentability mailed Jul. 2, 2020, for Application No. PCT/US2018/066689.

[No Author Listed], Defoamers Market Analysis by Product (Water-based, Oil-based, Silicone-based), by Application (Pulp & paper, Coatings, Agrochemicals, Water Treatment, Food & Beverages), by Region, and, Segment Forecasts, 2014-2025. Grand View Research. 2017. 10 pages.

[No Author Listed], Defoamers Market (Water Based, Silicone Based, Oil Based, and Others) Paper & Pulp, Paints & Coatings, Water Treatment, Food & Beverages, and Other End-user: Global Industry Perspective, Comprehensive Analysis, Size, Share, Growth, Segment, Trends and Forecast, 2015-2021. Zion Market Research. 2017. 22 pages.

[No Author Listed], Cost and Performance Baseline for Fossil Energy Plants vol. 1: Bituminous Coal and Natural Gas to Electricity. National Energy Technology Laboratory (NETL). Nov. 2010. 626 pages.

Aben et al., Cross continental increase in methane ebullition under climate change. Nature Communications. 2017;8:1682. Epub Nov. 22, 2017. 8 pages.

Bobji et al., Underwater Sustainability of the "Cassie" State of Wetting. Langmuir. 2009;25(20):12120-6. Epub Sep. 25, 2009.

Bocquet et al., Flow boundary conditions from nano- to microscales. Soft Matter. 2007;3:685-93. Epub Feb. 13, 2007.

Bridgham et al., Methane emissions from wetlands: biogeochemical, microbial, and modeling perspectives from local to global scales. Glob Chang Biol. May 2013;19(5):1325-46. Epub Feb. 11, 2013.

Chalmers et al., Microscopic visualization of insect cell-bubble interactions. II: The bubble film and bubble rupture. Biotechnol Prog. Mar.-Apr. 1991;7(2):151-8.

Chan et al., Film drainage and coalescence between deformable drops and bubbles. Soft Matter. 2011;7:2235-2264. Epub Dec. 3, 2010.

Cherry et al. Cell death in the thin films of bursting bubbles. Biotechnol Prog. Jan.-Feb. 1992;8(1):11-8.

De Maleprade et al., Spreading of Bubbles after Contacting the Lower Side of an Aerophilic Slide Immersed in Water. Phys Rev Lett. Aug. 26, 2016;117(9):094501. Epub Aug. 25, 2016. 5 pages.

Denkov, Mechanisms of Foam Destruction by Oil-Based Antifoams. Langmuir. May 6, 2004;20(22):9463-505. Epub Jun. 24, 2004.

Flynn et al., Underwater breathing: the mechanics of plastron respiration. J. Fluid Mech. Aug. 2008;608:275-96. Epub Jul. 11, 2008.

Hendrix et al., Spatiotemporal evolution of thin liquid films during impact of water bubbles on glass on a micrometer to nanometer scale. Phys Rev Lett. Jun. 15, 2012;108(24):247803. Epub Jun. 15, 2012. 4 pages.

Kalogirou, S. A., Seawater desalination using renewable energy sources. Prog. Energy Combust. Sci. 2005;31:242-81. Epub May 26, 2005.

Kirschke et al., Three decades of global methane sources and sinks. Nature Geoscience. 2013;6:813-23. Epub Sep. 22, 2013.

Krasowska et al., Air at hydrophobic surfaces and kinetics of three phase contact formation. Adv Colloid Interface Sci. Mar.-Jun. 2009; 147-148:155-69. Epub Nov. 1, 2008.

Li et al., Monostable superrepellent materials. PNAS. Mar. 28, 2017;114(13):3387-92. Epub Mar. 9, 2017.

Lv et al., Metastable states and wetting transition of submerged superhydrophobic structures. Physical Review Letters. May 16, 2014;112(19):196101. Epub May 12, 2014. 5 pages.

Manica et al., Force Balance Model for Bubble Rise, Impact, and Bounce from Solid Surfaces. Langmuir. Jun. 23, 2015;31(24):6763-72. Epub Jun. 9, 2015.

Marmur, Underwater Superhydrophobicity: Theoretical Feasibility. Langmuir. 2006;22:1400-2. Jan. 24, 2006.

McHale et al., Immersed superhydrophobic surfaces: Gas exchange, slip and drag reduction properties. Soft Matter. 2010;6:714-9. Epub Nov. 19, 2009.

McHale et al., Terminal velocity and drag reduction measurements on superhydrophobic spheres. Appl. Phys. Lett. 2009;94:064104. Epub Feb. 10, 2009.

Moore, The velocity of rise of distorted gas bubbles in a liquid of small viscosity. J. Fluid Mech. Dec. 1965;23(4):749-66.

Patankar, N., Thermodynamics of Trapping Gases for Underwater Superhydrophobicity. Langmuir. Jul. 12, 2016;32(27):7023-8. Epub Jun. 27, 2016.

Pelton, A review of antifoam mechanisms in fermentation. J Ind Microbiol Biotechnol. Oct. 2002;29(4):149-54.

Poetes et al., Metastable Underwater Superhydrophobicity. Physical Review Letters. 2010;105:166104. 4 pages. Epub Oct. 14, 2010.

Prins et al., Proteins and surface effects in fermentation: foam, antifoam and mass transfer. Trends in Biotechnology. Nov. 1, 1987;5(11):296-301.

Shirtcliffe et al., Plastron properties of a superhydrophobic surface. Appl. Phys. Lett. 2006;89:104106. Epub Sep. 8, 2006.

Srinivasan et al., Drag reduction for viscous laminar flow on spray-coated non-wetting surfaces. Soft Matter. 2013;9:5691-702. Epub Apr. 25, 2013.

Thorpe, Plastron respiration in aquatic insects. Biol Rev Camb Philos Soc. Jul. 1950;25(3):344-90.

Wang et al., Air Bubble Bursting Effect of Lotus Leaf. Langmuir. Dec. 15, 2009;25(24):14129-34. Epub Jul. 7, 2009.

Yong et al., Bioinspired Design of Underwater Superaerophobic and Superaerophilic Surfaces by Femtosecond Laser Ablation for Anti- or Capturing Bubbles. ACS Appl Mater Interfaces. Nov. 15, 2017;9(45):39863-71. Epub Nov. 3, 2017.

Yvon-Durocher et al., Methane fluxes show consistent temperature dependence across microbial to ecosystem scales. Nature. Mar. 2, 20147;507(7493):488-91. doi: 10.1038/nature13164. Epub Mar. 19, 2014.

Zawala et al., Dynamics of dewetting and bubble attachment to rough hydrophobic surfaces—Measurements and modelling. Miner. Eng. 2016;85:112-22. Epub Nov. 7, 2015.

* cited by examiner

FOAM REDUCTION AND/OR PREVENTION METHODS AND ASSOCIATED SYSTEMS AND ARTICLES

RELATED APPLICATIONS

This application is a continuation of U.S. patent application Ser. No. 16/955,200, filed Jun. 18, 2020, and entitled "Foam Reduction and/or Prevention Methods and Associated Systems and Articles," which is a national stage filing under 35 U.S.C. § 371 of International Patent Application Serial No. PCT/US2018/066689, filed Dec. 20, 2018, and entitled "Foam Reduction and/or Prevention Methods and Associated Systems and Articles," which claims priority under 35 U.S.C. § 119(e) to U.S. Provisional Application No. 62/608,394, filed Dec. 20, 2017, and entitled "Foam Reduction and/or Prevention Methods and Associated Systems and Articles," each of which is incorporated herein by reference in its entirety for all purposes.

TECHNICAL FIELD

Articles, systems, and methods for reducing or preventing foam are generally described.

SUMMARY

Foam reduction and/or prevention using a variety of articles, systems, and methods is generally described. According to certain embodiments, surfaces with certain wetting properties can be used to reduce or eliminate the formation of foam from bubble-containing liquids. In some embodiments, a surface with certain wetting properties is configured and/or arranged within bubble-containing liquids such that the surface provides a gaseous fluidic pathway through which gas from the bubbles within the liquid may be channeled to a gaseous environment outside the liquid. The subject matter of the present invention involves, in some cases, interrelated products, alternative solutions to a particular problem, and/or a plurality of different uses of one or more systems and/or articles.

In some embodiments, a method for reducing or preventing foam formation is described, wherein the method comprises at least partially submerging a surface into a bubble-containing liquid, the surface being non-wetting with respect to the liquid of the bubble-containing liquid, such that bubbles within the bubble-containing liquid are transported proximate the surface, and gas from within the bubbles is transported along the surface such that accumulation of the bubbles into a foam layer is reduced or prevented.

According to certain embodiments, a method for transporting bubbles out of a bubble-containing liquid is described, comprising at least partially submerging a surface into the bubble-containing liquid, such that bubbles within the bubble-containing liquid are transported proximate the surface, and gas from within the bubbles is transported along the surface until the gas from within the bubbles enters a gaseous environment separate from the bubble-containing liquid.

Certain embodiments relating to a system for the reduction or prevention of foam formation are described, wherein the system comprises a liquid, a source of bubbles within and/or in fluidic communication with the liquid, and a surface at least partially submerged within the liquid, wherein the surface is non-wetting with respect to the liquid.

In some embodiments, the article comprises a surface comprising a plurality of features that allow for the removal of gas from within bubbles via a plastron layer.

According to some embodiments, the method for reducing a volume of foam comprises at least partially submerging a surface into the foam comprising bubbles defined by liquid layers, the surface being non-wetting with respect to the liquid layers of the bubbles, such that gas from within the bubbles is transported along the surface and the volume of the foam is reduced.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
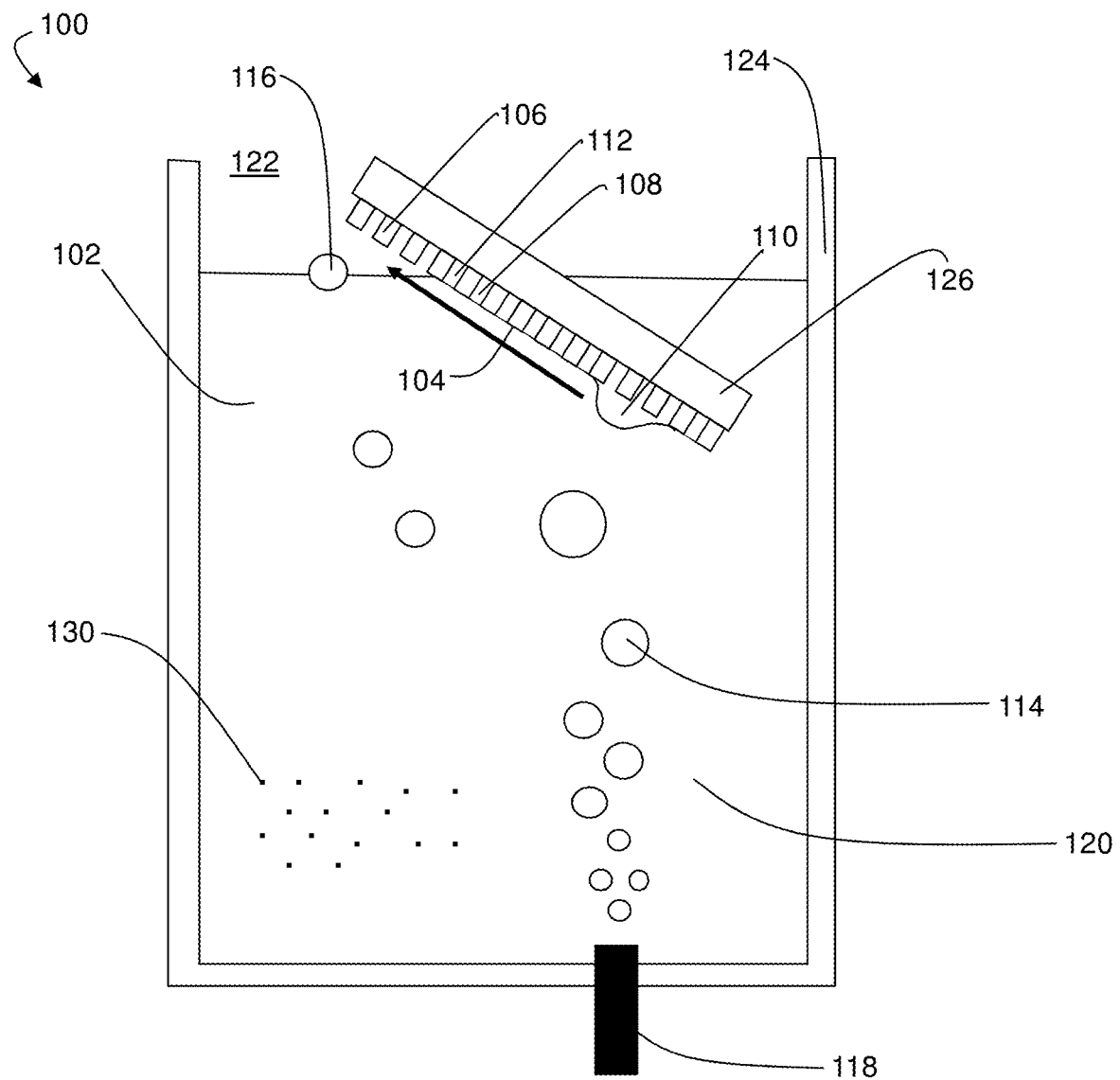
FIG. 1A is, in accordance with certain embodiments, a cross-sectional schematic diagram of a system in which a surface is used to reduce or prevent foaming.

Articles, systems, and methods for the reduction and/or prevention of foam are generally described. The reduction and/or prevention of foaming is an important and useful tool in many manufacturing processes including water treatment, food and beverage industries, agrochemicals, and the paper industry. Many examples of liquids could benefit from foam reduction and/or prevention, including liquids located within reactors or other containers, and liquids located within fluidic conduits.

According to certain embodiments, surfaces having certain wetting properties with respect to the liquid phase of a bubble-containing liquid can be used to reduce or eliminate the volume of bubbles present within the bubble-containing liquid and/or at the interface of a liquid and another fluid (e.g., gas and/or liquid). In some embodiments, the surface is not wetted by the liquid phase of the bubble-containing liquid. The surface can, in certain embodiments, interact with the gas within the bubbles of the bubble-containing liquid such that the gas within the bubbles is transported along the surface to a gaseous environment outside the liquid in a manner such that bubbles do not accumulate to form foam. In certain cases, the surface can interact with bubbles of already-formed foam to reduce the volume of foam that is present.

In one set of embodiments, the surface includes a gaseous fluidic pathway via which the gas within bubbles is removed from the bubbles and transported out of the liquid and/or out of a foam. The gaseous fluidic pathway may be provided, according to certain embodiments, by arranging features (e.g., milliscale, microscale, and/or nanoscale features) on the surface such that gas is retained between the features when the surface is submerged into a bubble containing liquid and/or a foam. The gas retained between the features can form at least a portion of a gaseous fluidic pathway that connects submerged portions of the surface to a gaseous environment outside the liquid and/or foam. In some such embodiments, when bubbles reach the submerged portion of the surface, the bubbles interact with the gas between the features such that the gas within the bubbles is removed from the bubbles and incorporated into the gaseous fluidic pathway on the surface. In some such cases, the gas is transported along the surface, out of the bubbles (e.g., within the bubble-containing liquid and/or a foam), and into a gaseous environment outside the bubbles without forming a new bubble (e.g., at the interface of a bubble-containing liquid and the gaseous environment outside of the bubble-containing liquid and/or anywhere else along the pathway out of the liquid).

As noted above, certain embodiments are related to systems and methods for reducing and/or preventing the formation of foam (e.g., within bubble-containing liquids). According to certain embodiments, the formation of foam can be reduced and/or prevented by transporting the gas from within bubbles of a bubble-containing liquid out of the bubble-containing liquid such that bubbles do not accumulate at an interface of the liquid and another fluid.

In certain embodiments, the surface is at least partially submerged into a bubble-containing liquid. FIG. 1A is an exemplary cross-sectional schematic diagram of a system in which a surface is used to reduce or prevent foam formation. In FIG. 1A, surface 104 is partially submerged into bubble-containing liquid 102 contained within container 124. While the embodiment illustrated in FIG. 1A shows surface 104 partially submerged into bubble-containing liquid 102, in other embodiments, surface 104 can be completely submerged in bubble-containing liquid 102, as described elsewhere herein.

Figure 1B:
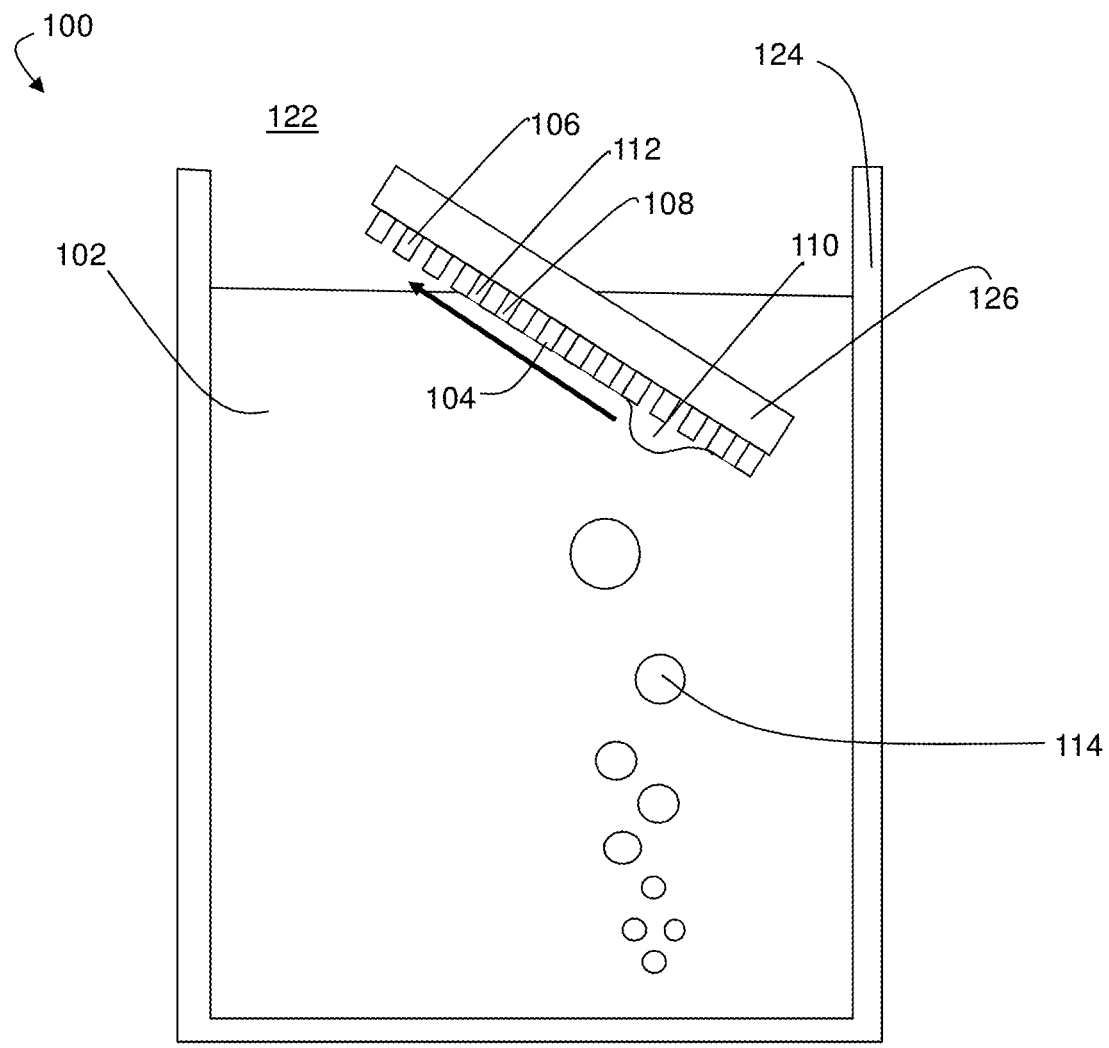
FIG. 1B is a cross-sectional schematic diagram of a system in which a surface is used to reduce or prevent foaming, according to some embodiments.
Figure 1C:
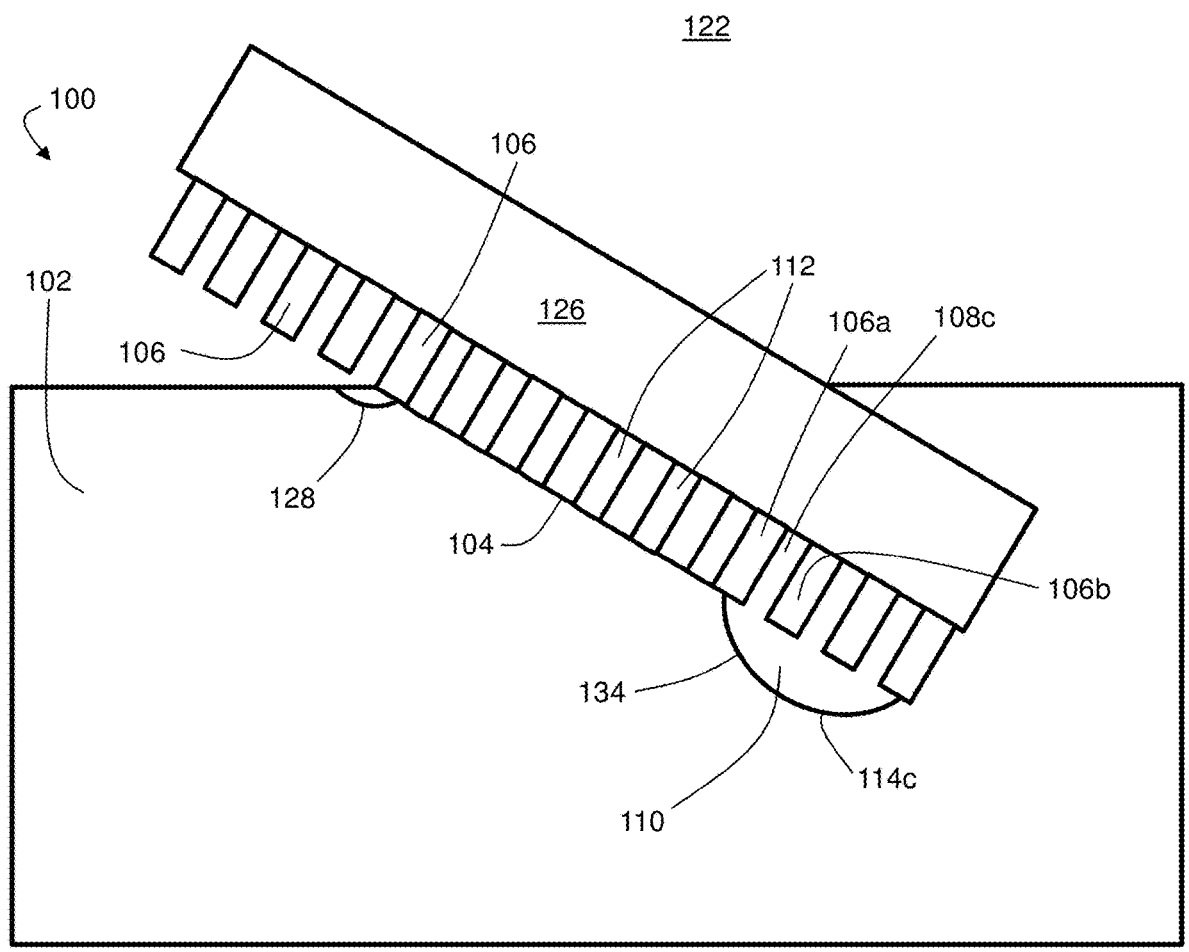
FIG. 1C is a cross-sectional schematic diagram illustrating the interaction of a bubble with a surface, according to certain embodiments.
Figure 2A:
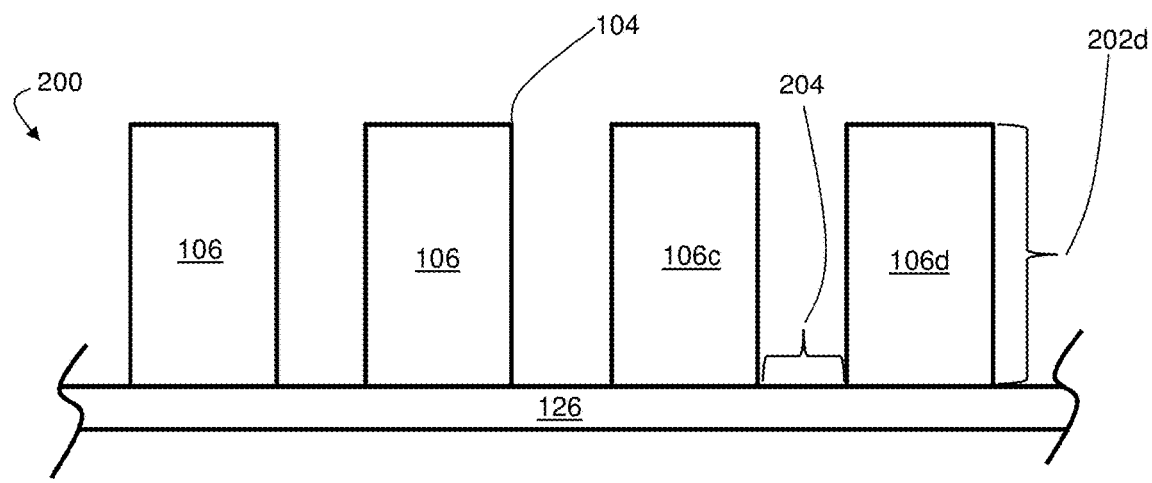
FIG. 2A is a cross-sectional schematic diagram of a surface portion that can be used, according to certain embodiments, to reduce or prevent foaming.
Figure 2B:
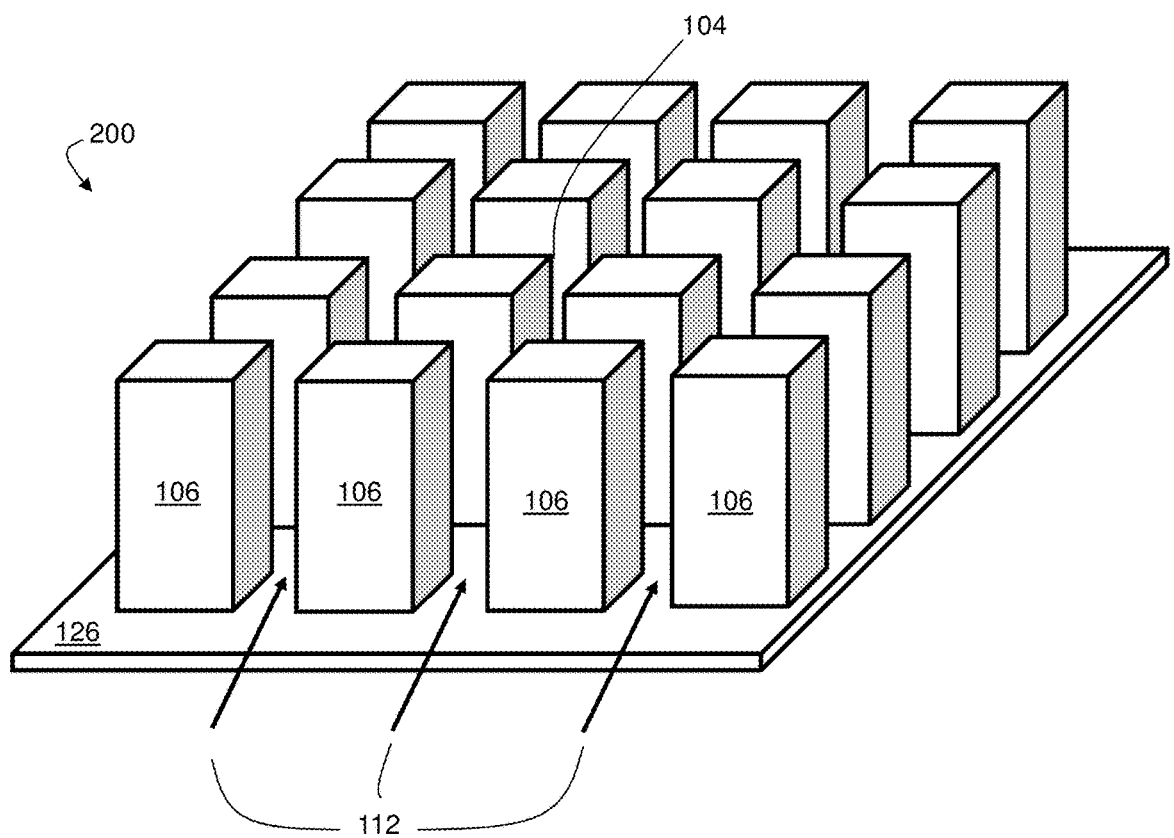
FIG. 2B is a perspective view schematic diagram of the surface portion shown in FIG. 2A.
Figure 2C:
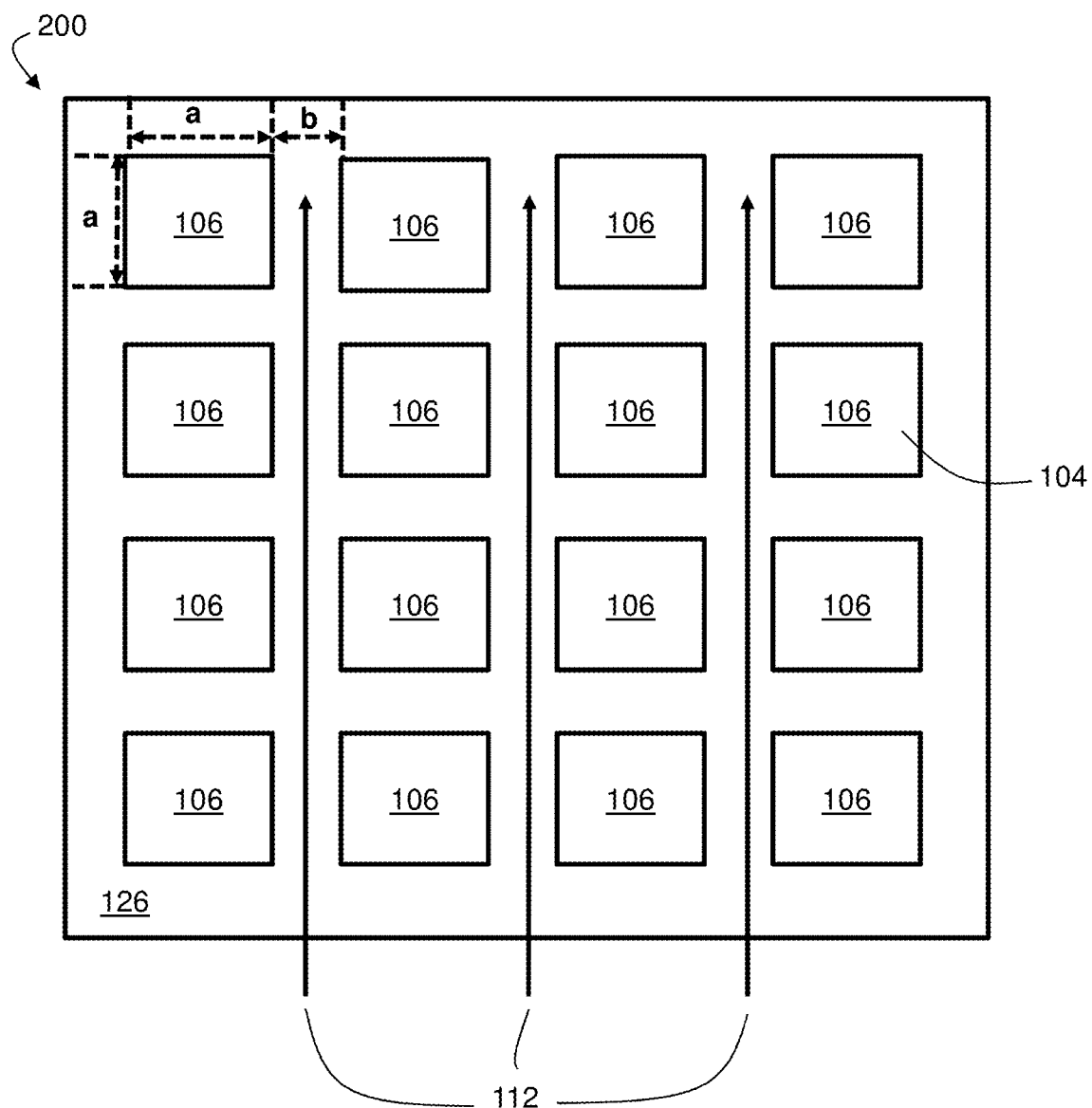
FIG. 2C is a top view schematic diagram of the surface portion shown in FIGS. 2A-2B.

According to certain embodiments, when the surface is at least partially submerged into the bubble-containing liquid, the surface can be used to direct the gas within the bubbles from the bulk of the bubble-containing liquid to the gaseous environment outside of the bubble-containing liquid. In some embodiments, the surface is at least partially submerged in a configuration such that a continuous gaseous pathway is established from the submerged portion of the surface to the gaseous environment outside the bubble-containing liquid. This can be achieved, for example, by submerging the surface such that gas between features (e.g., milliscale, microscale, and/or nanoscale features) forms a gaseous fluidic pathway from a submerged portion of the surface to a non-submerged portion of the surface. For example, as shown in FIG. 1A, surface 104 is at least partially submerged into bubble-containing liquid 102 such that gas 108 is trapped between features 106. Gas 108 trapped between features 106 can establish a continuous gaseous pathway from a submerged portion of surface 104 to gaseous environment 122. The continuous gaseous pathway established by features 106 can be seen more clearly, for example, by referring to FIGS. 2A-2C. FIG. 2A is a cross-sectional schematic diagram of a surface portion comprising features, which can be used, according to certain embodiments, to reduce or prevent foaming. FIG. 2B is a perspective view schematic diagram of the surface portion shown in FIG. 2A, and FIG. 2C is a top view schematic diagram of the surface portion shown in FIGS. 2A-2B. The surface portions shown in FIGS. 2A-2C can, according to certain embodiments, be parts of the surfaces illustrated in FIGS. 1A-1C. As shown in FIG. 2B-2C, continuous gaseous fluidic pathway 112 is established between features 106. Continuous gaseous fluidic pathway 112 can be arranged, according to certain embodiments, such that one end of the pathway is submerged within bubble-containing liquid 102 and another end of the pathway is contained within gaseous environment 122.

The bubble-containing liquid generally includes a liquid phase and bubbles contained within the liquid phase. For example, as shown in FIG. 1A, bubble-containing liquid 102 includes liquid phase 120 and submerged bubbles 114 contained within bubble-containing liquid 102 and liquid phase 120. As used herein, the term "bubble" is given its ordinary meaning in the art, and refers to a gaseous phase surrounded by a liquid. According to certain embodiments, a bubble can have any suitable shape, such as spherical, deviational from spherical, or ellipsoidal. As used herein, an "emulsion" (i.e., a first liquid phase surrounded by a second liquid phase, such as in an oil-in-water emulsion) is not a "bubble."

In some embodiments, the bubbles are completely submerged in the bulk (e.g., liquid phase) of the bubble-containing liquid (e.g., a "submerged bubble"). For example, as shown in FIG. 1A, submerged bubbles 114 are in the bulk of bubble-containing liquid 102. According to some other embodiments, the bubbles are at the interface of the bubble-containing liquid and another fluid (e.g., a gaseous environment outside the bubble-containing liquid, another liquid, etc.), with a thin layer of liquid at least partially surrounding the gas of the bubble (e.g., an "interface bubble"). For example, as shown in FIG. 1A, submerged bubbles 114 travel through the bulk of bubble-containing liquid 102 and reach the interface of bubble-containing liquid 102 and gaseous environment 122 outside bubble-containing liquid 102, generating layer bubble 116 at the interface of bubble-containing liquid 102 and gaseous environment 122. In some cases, an interface bubble can migrate away from the liquid such that the interface bubble is completely surrounded by a thin layer of liquid.

The bubbles, if allowed to accumulate, can form a foam. The term "foam," as used herein, is given its ordinary meaning in the art, and refers to an accumulation of a plurality of pockets of entrapped gas. An example of a foam is shown, for example, in FIG. 6, and is described in more detail below.

As noted above, in some embodiments, the surface that is used to reduce and/or prevent foam comprises a plurality of features. The features can include, according to certain embodiments, milliscale features, microscale features, and/or nanoscale features. In some embodiments, the features comprise protrusions. According to certain embodiments, the features comprise ridges, pores, spikes and/or posts. Examples of suitable features that can be used to reduce and/or prevent foam formation are shown in FIG. 2A-2C.

According to certain embodiments, the features are at least partially submerged into the bubble-containing liquid as the surface is at least partially submerged into the bubble-containing liquid. For example, as shown in FIG. 1A, surface 104 is partially submerged into bubble-containing liquid 102, and surface 104 comprises features 106 which are partially submerged into bubble-containing liquid 102.

In certain embodiments, gas is positioned between the features that are submerged into the liquid. For example, referring to FIG. 1A, gas 108 is positioned between features 106 that are submerged into bubble-containing liquid 102.

As noted above, according to certain embodiments, the gas positioned between the features defines a gaseous fluidic pathway from within the liquid to a gaseous environment outside the bubble-containing liquid. For example, in some cases, gas positioned between the features prior to submersion of the surface remains trapped between the features after submersion. This can result in the formation of a continuous gaseous fluidic pathway from a submerged portion of the surface to a non-submerged portion of the surface. The trapped gas positioned between the features that forms a continuous gaseous fluidic pathway between the features adjacent to the surface is also referred to herein as a "plastron layer." One example of such a layer can be understood in reference to FIGS. 1A-1C and 2A-2C. In some embodiments, system 100 comprises surface 104 submerged into bubble-containing liquid 102, and gas positioned between features 106 remains trapped between features 106 after the surface has been submerged. The trapped gas can continue to define gaseous fluidic pathway 112 even after submersion of surface 104, which together define a plastron layer. According to certain embodiments, the plastron layer remains stable underwater due to capillary forces between the exposed surface 104 of system 100 and the liquid.

In certain embodiments, the system comprises a source of bubbles within and/or in fluidic communication with the liquid. The source of bubbles within and/or in fluidic communication with the liquid, in accordance with some embodiments, can be any of a variety of suitable sources of bubbles (e.g., a conduit, a chemical reaction), as described in more detail elsewhere herein. According to certain embodiments, submerged bubbles are transported from the source of bubbles, through the bubble-containing liquid, to the surface when the surface is at least partially submerged in the bubble-containing liquid. For example, as shown in FIG. 1A, source 118 of bubbles (e.g., a conduit) within liquid phase 120 provides submerged bubbles 114 that are transported from source 118 of bubbles, through bubble-containing liquid 102, to surface 104 when surface 104 is submerged in bubble-containing liquid 102.

According to certain embodiments, bubbles within the bubble-containing liquid are transported proximate the surface. For example, referring to FIG. 1A, in some embodiments, one or more of submerged bubbles 114 can be transported through bubble-containing liquid 102 until the one or more bubbles is proximate surface 104. As shown in FIG. 1C, bubble 114c has been transported through bubble-containing liquid 102 such that it is proximate surface 104.

According to some embodiments, the walls of bubbles may be breached once the bubbles have been transported proximate the surface. For example, as shown in FIG. 1C, bubble 114c is proximate surface 104, and wall 134 of bubble 114c has been breached. Without wishing to be bound by any particular theory, the walls of the bubbles may be breached due to the non-wetting nature of surface 104 with respect to the liquid in which the bubbles are formed.

In some embodiments, gas positioned between the features of the surface can interact with the gas within the bubbles of the bubble-containing liquid after the bubbles have been transported proximate the submerged surface. As shown in FIG. 1C, gas 108c positioned between features 106a and 106b has interacted with gas 110, which had been contained within bubble 114c before the wall of bubble 114c was breached.

According to certain embodiments, the gas from within the bubbles merges with gas positioned adjacent the surface. For example, in some embodiments, the gas from within bubbles merges with gas positioned between the features that define the surface. In some such embodiments, the gas from within the bubbles merges with a plastron layer associated with the surface. For example, referring to FIG. 1C, according to certain embodiments, gas 110 can merge with gas 108c, which may form a part of gaseous fluidic pathway 112 shown in FIG. 2B. In some embodiments, the gas from within the bubbles merges with the gas positioned between the features such that the gas from within the bubbles becomes part of the gaseous fluidic pathway (i.e., plastron layer).

In some embodiments, merging of a previously submerged bubble with the gaseous fluidic pathway can result in removal of the previously submerged bubble from the bubble containing liquid. For example, referring to FIG. 1C, in some embodiments, gas 110 completely merges with gas 108 between the features, such that there is no longer a bubble that is distinguishable from the other pockets of gas 108 trapped between features 106.

According to certain embodiments, gas from within bubbles (e.g., previously submerged bubbles) is transported along the surface (e.g., via the gaseous fluidic pathway defined between features) until the gas from within the bubbles enters a gaseous environment separate from the liquid. For example, as noted above, when a bubble impacts the plastron layer adjacent the submerged surface, the bubble can rupture and release the gas it contains to the plastron layer. In some embodiments, after the gas has been released to the plastron layer, the gas travels along the gaseous fluidic pathway until it is released to the environment outside the bubble-containing liquid. For example, referring to FIG. 1C, in some embodiments, after gas 110 merges with gas 108c, the merged gas may be transported out of bubble-containing liquid 102 and into gaseous environment 122 via the gaseous pathway formed by trapped gas 108 (see, e.g., gaseous fluidic pathway 112 illustrated in FIGS. 2B and 2C). In some embodiments, the transport of the gas to the surrounding environment occurs because the movement of the gas previously contained within the submerged bubble is no longer restricted by the wall of the bubble once the wall has been ruptured.

According to certain embodiments, gas from within multiple bubbles is transported along the plastron layer such that accumulation of the bubbles into a foam layer is reduced or prevented. According to certain embodiments, if bubbles from the bubble-containing liquid are caught by the surface, then a foam layer in the bubble-containing liquid can be reduced and/or prevented. According to certain embodiments, as the gas from within multiple bubbles (e.g., submerged bubbles) continuously travels along the gaseous fluidic pathway to the gaseous environment outside of the bubble-containing liquid, bubbles at the interface (e.g., layer bubbles) and/or a layer of bubbles (e.g., foam) will be reduced and/or prevented.

While the description above has primarily focused on the reduction and/or prevention of the formation of foam, the present disclosure also relates to systems and methods for reducing the volume of a foam that has already been formed. The systems and methods for reducing the volume of a foam can be performed in addition to or in place of methods for the reduction and/or prevention of the formation of foam.

In certain embodiments, submerged bubbles are transported from a source of the submerged bubbles, through the bubble-containing liquid, and to an interface of the bubble-containing liquid and a gaseous environment outside the liquid while the surface is not submerged in the bubble-containing liquid. This can generate, according to some embodiments, a layer of foam at the interface of the bubble-containing liquid and the gaseous environment outside of the liquid. In certain embodiments, the surface is at least partially submerged into this foam. The bubble walls can, according to certain embodiments, contain a liquid, and the surface can be non-wetting with respect to the liquid.

Figure 6:
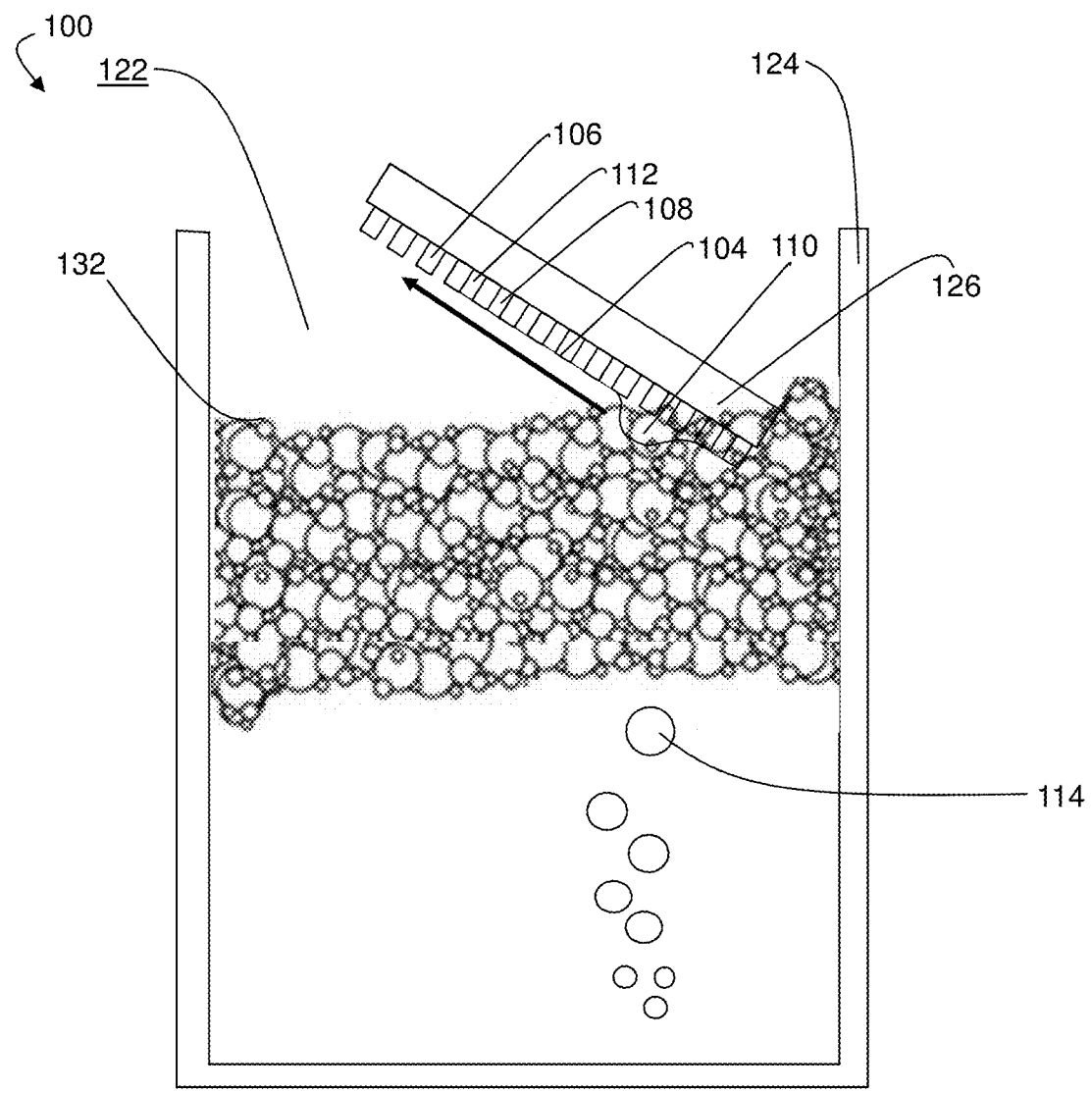
FIG. 6 is a cross-sectional schematic diagram of a system in which a surface partially submerged into foam is used to reduce foaming, according to some embodiments.

FIG. 6 is a cross-sectional schematic diagram of a system in which a surface partially submerged into foam is used to reduce the volume of the foam, in accordance with certain embodiments. As shown in FIG. 6, surface 104 is partially submerged into foam 132.

According to certain embodiments, gas from within the bubbles is transported along the surface and the volume of the foam is reduced. In some such embodiments, the bubbles of the foam interact with the surface such that the walls of the bubbles are breached (e.g., in a manner similar to that described above with respect to submerged bubbles). In some embodiments, after the walls of the bubble are breached, gas from within the bubbles merges with the gas positioned between the features that make up the submerged surface. In certain embodiments, the gas from within the bubbles of the foam is transported along the surface (e.g., via a continuous gaseous pathway formed by the gas trapped between the features, such as the plastron layer) until the gas from within the bubbles of the foam enters a gaseous environment separate from the foam. According to some embodiments, for example, as shown in FIG. 6, gas 110 from within the bubbles merges with gas 108 positioned between features 106. According to certain embodiments, the merged gas is transported along surface 104 until the merged gas enters gaseous environment 122 separate from foam 132.

In some embodiments, certain of the surfaces described herein can be designed to have certain wetting properties that can be useful in reducing and/or eliminating an amount of foam (foam that has already formed and/or foam that has not yet formed). According to some embodiments, the surface is non-wetting with respect to the liquid of the bubble-containing liquid. For example, in FIG. 1A, surface 104 is non-wetting with respect to liquid phase 120 of bubble-containing liquid 102, according to certain embodiments. In some embodiments, the surface is non-wetting with respect to the liquid that defines the wall of a foam. For example, in FIG. 6, surface 104 can be non-wetting with respect to the liquid from which the walls of the bubbles in foam 132 are made.

Figure 4A:
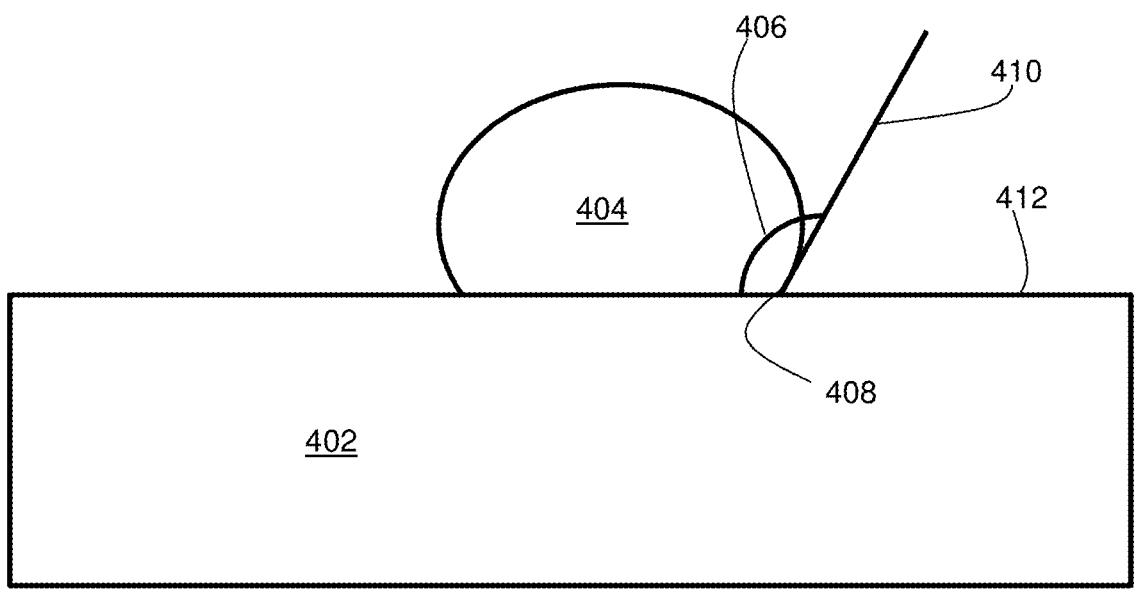
FIG. 4A is an exemplary cross-sectional schematic diagram illustrating the interaction of a liquid droplet with a surface when the surface is non-wetting with respect to the liquid.
Figure 4B:
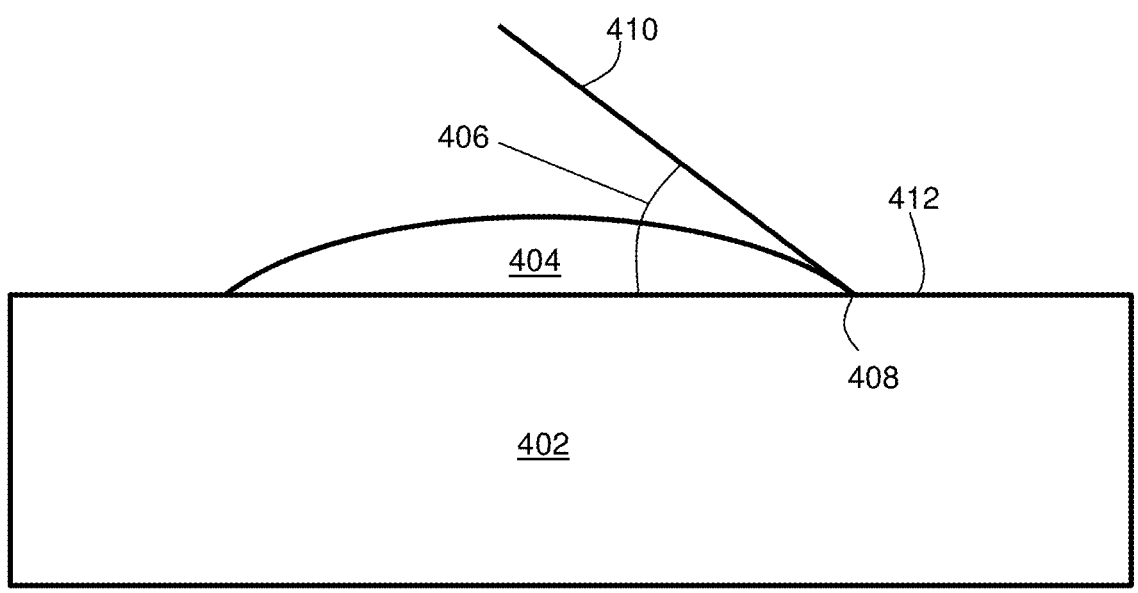
FIG. 4B is an exemplary cross-sectional schematic diagram illustrating the interaction of a liquid droplet with a surface when the surface is wetting with respect to the liquid.

As used herein, a surface is considered to be non-wetting with respect to a liquid when, if a droplet of the liquid is positioned on the surface in a gaseous environment at the temperature and pressure at which the liquid and surface are being used, the droplet forms a contact angle, as measured through the bulk of the droplet, of greater than 90°. FIG. 4A shows an exemplary cross-sectional schematic diagram illustrating the interaction of liquid droplet 404 with surface 412 of substrate 402 when the surface is non-wetting with respect to the liquid. As shown in FIG. 4A, contact angle 406 is measured between (1) line 410 drawn tangent to the exterior surface of droplet 404 at point of contact 408 with substrate surface 412 and (2) substrate surface 412. Contact angle 406 is measured through the bulk of droplet 404. In FIG. 4A, contact angle 406 is greater than 90° (e.g., about 120°). This indicates that substrate surface 412 is non-wetting with respect to droplet 404 of the liquid. Conversely, FIG. 4B shows an exemplary cross-sectional schematic diagram illustrating the interaction of a liquid droplet with a surface when the surface is wetting with respect to the liquid. Contact angle 406 between droplet 404 of the liquid on substrate surface 412 is less than 90° (e.g., about 50° in FIG. 4B), indicating that substrate surface 412 is non-wetting with respect to droplet 404 of the liquid.

According to certain embodiments, the surface is non-wetting with respect to the liquid at a temperature of 25° C. and at a pressure of 1 atmosphere.

Non-limiting examples of non-wetting surfaces include surfaces with properties understood by those skilled in the art. According to certain embodiments, for example, surfaces that are superhydrophobic, superoleophobic, supermetallophobic, superomniphobic, hydrophobic, oleophobic, metallophobic, and/or omniphobic can be used.

According to certain embodiments, the contact angle between the surface and the liquid may be relatively large when the surface is non-wetting with respect to the liquid. For example, according to certain embodiments, the contact angle between the surface and the liquid, when the surface is non-wetting with respect to the liquid, is greater than 100°, greater than 105°, greater than 110°, greater than 120°, greater than 130°, greater than 140°, greater than 150°, greater than 160°, or greater than 170°. In some embodiments, the contact angle between the liquid and the surface, when the surface is non-wetting with respect to the liquid, is less than 179°, less than 170°, less than 160°, less than 150°, less than 140°, less than 130°, less than 120°, less than 110°, or less than 100°. Combinations of these values are also possible (e.g., greater than 100° and less than 130°, or greater than 150° and less than 179°). The contact angle between the surface and the liquid can fall within any of these ranges, for example, when the droplet of the liquid and the surface are present at conditions at which the method is performed (e.g., during use). In some embodiments, the surface is configured such that a droplet of the liquid of the bubble-containing liquid forms a contact angle of greater than 100° when the droplet of the liquid of the bubble-containing liquid is present on the surface, or when the droplet of the liquid and the surface are present at conditions at which the method is performed. According to certain embodiments, the surface is configured such that a droplet of the liquid of the bubble-containing liquid forms a contact angle of greater than 120° when the droplet of the liquid of the bubble-containing liquid is present on the surface, or when the droplet of the liquid and the surface are present at conditions at which the method is performed.

As noted above, in some embodiments, the surface comprises a plurality of features. The features can include, according to certain embodiments, milliscale features, microscale features, and/or nanoscale features. In certain embodiments, the features may be dispersed on the surface in a random (e.g., fractal) or patterned manner. In some embodiments, the features comprise protrusions. Non-limiting examples of protrusions include spherical or hemispherical protrusions, such as ridges, pores, spikes, and posts. In some embodiments, the features comprise ridges, pores, spikes and/or posts.

The features, in accordance with certain embodiments, may be introduced to the surface using a variety of suitable methods, including mechanical and/or chemical methods. For example, in some embodiments, the features can be introduced to the surface via lithography. In certain embodiments, the features can be introduced to the surface via self-assembly. In some embodiments, the features can be deposited onto a substrate. According to certain embodiments, the features can be etched into the substrate (e.g., using acid etching, base etching, and/or plasma etching). In certain embodiments, the features can be introduced to the surface via laser ablation. In some embodiments, the features can be sintered onto the substrate (e.g., via powder sintering). Certain embodiments comprise forming the features by inducing phase change and/or crystallization. For example, in some embodiments, features are formed when a material is melted and/or dissolved and when the material solidifies again (e.g., during cooling and/or precipitation, for example, after solvent has evaporated) it forms solid features (e.g., in the form of crystals). These solid features can serve as the features described elsewhere herein (e.g., milliscale, microscale, and/or nanoscale features).

Figure 3:
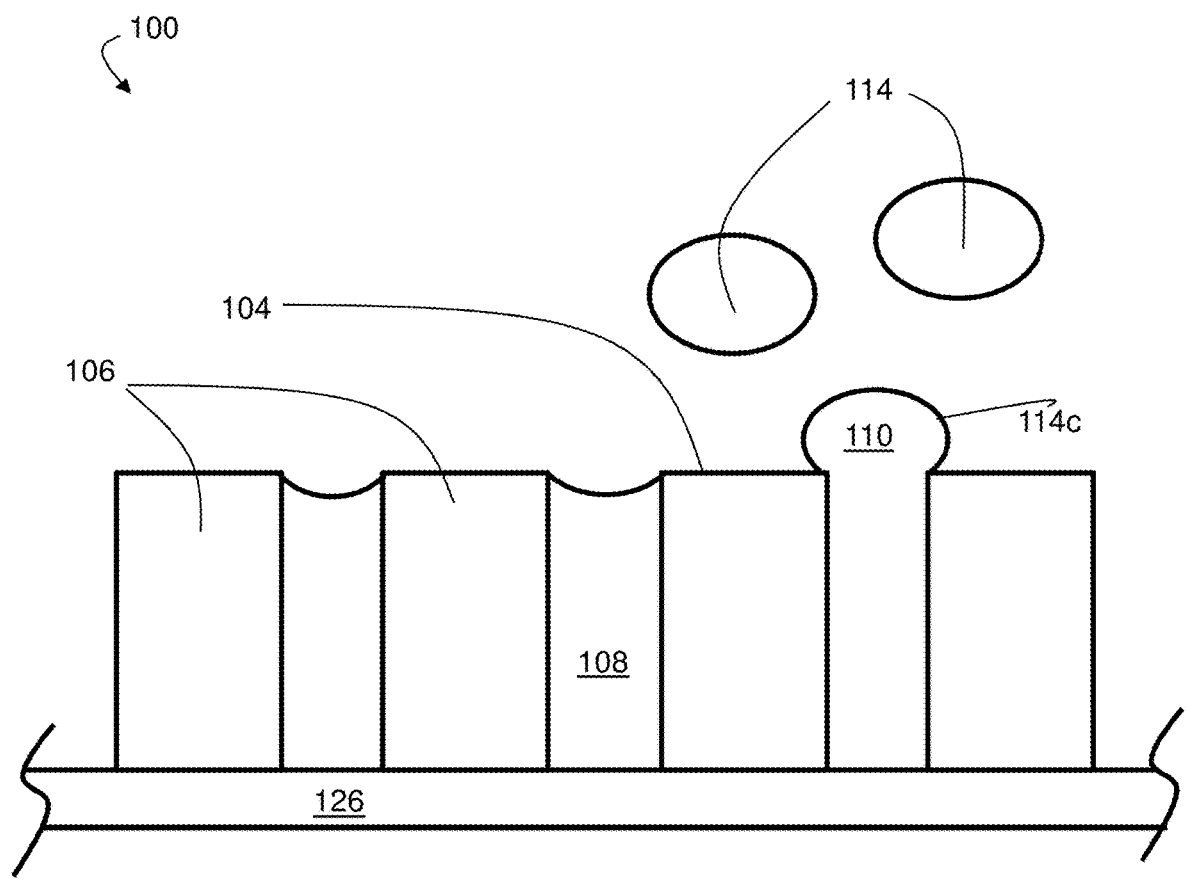
FIG. 3 is a cross-sectional schematic diagram illustrating the interaction of bubbles with gas positioned between features on a surface portion, according to some embodiments.

As noted above, according to certain embodiments, gas is positioned between the features on the surface. According to certain embodiments, the features form a matrix of solid features spaced sufficiently close to stably contain gas therebetween or therewithin once the surface has been at least partially submerged into the bubble-containing liquid. For example, FIG. 3 shows a cross-sectional schematic diagram illustrating the interaction of bubbles with gas positioned between features on a surface, according to some embodiments. In FIG. 3, system 100 comprises surface 104 comprising a plurality of features 106. According to certain embodiments, features 106 are posts. Features 106 form, in accordance with certain embodiments, a matrix of solid features on substrate 126 that are sufficiently close and stably contain gas 108 therebetween. According to some embodiments, as shown in FIG. 3 and as described herein, submerged bubbles 114 approach surface 104. Upon reaching surface 104, gas 110 from within bubble 114c merges with gas 108 positioned between microscale and/or nanoscale features 106, in accordance with certain embodiments. Gas 110 from within bubbles 114c can then be transferred to and along the plastron layer, in accordance with certain embodiments.

In some embodiments, the spacing between the features is selected such that the features are able to trap gas between the features when submerged into a foam and/or a bubble containing liquid. For example, referring to FIG. 2A, in some embodiments, spacing 204 between features 106c and 106d can be selected such that gas is trapped between features 106c and 106d when surface 104 is submerged into a foam and/or a bubble containing liquid.

According to certain embodiments, the surface can be at least partially made up of milliscale features. "Milliscale" is used herein in a manner consistent with its ordinary meaning in the art. Milliscale features are features having a maximum height of greater than 100 micrometers and up to 10 millimeters. Maximum height generally refers to the longest dimension from the substrate on which the feature is positioned to the end of the feature opposite the substrate. As one illustrative example, referring to FIG. 2A, feature 106d has maximum height 202d. The maximum heights of milliscale features may be measured by electron microscopy techniques (e.g., scanning electron microscopy and/or transmission electron microscopy). The electron microscopy techniques can be supplemented by, for example, profilometry (e.g., optical or contact profilometers).

According to some embodiments, the maximum height of the milliscale features is greater than 100 micrometers and up to 1 millimeter, greater than 100 micrometers and up to 200 micrometers, from 200 micrometers to 300 micrometers, from 300 micrometers to 500 micrometers, from 500 micrometers to 700 micrometers, from 700 micrometers to 1 millimeter, from 1 millimeter to 3 millimeters, from 3 millimeters to 5 millimeters, and/or from 5 millimeters to 10 millimeters. Combinations of the above cited ranges are also possible (e.g., from 300 micrometers to 700 micrometers, or from 200 micrometers to 1 millimeter).

In accordance with various embodiments, the surface can be at least partially made up of microscale features. "Microscale" is used herein in a manner consistent with its ordinary meaning in the art. Microscale features are features having a maximum height of from 1 micrometer to 100 micrometers. According to some embodiments, the maximum height of the microscale features is from 1 micrometer to 10 micrometers, 10 micrometers to 20 micrometers, 20 micrometers to 30 micrometers, 30 micrometers to 50 micrometers, 50 micrometers to 70 micrometers, or 70 micrometers to 100 micrometers. Combinations of the above cited ranges are also possible (e.g., 30 micrometers to 70 micrometers, or 20 micrometers to 100 micrometers).

In certain embodiments, nanoscale features are used. "Nanoscale" is used herein in a manner consistent with its ordinary meaning in the art. Nanoscale features are features from 1 nm to 1 micrometer in maximum height. According to some embodiments, the maximum height of the nanoscale features is from 1 nm to 100 nm, 100 nm to 200 nm, 200 nm to 300 nm, 300 nm to 500 nm, 500 nm to 700 nm, or 700 nm to 1 micrometer. Combinations of the above cited ranges are also possible (e.g., 300 nm to 700 nm, or 200 nm to 1 micrometer).

According to certain embodiments, the features (e.g., the milliscale, microscale, and/or the nanoscale features) may have any of a variety of suitable characteristic spacings. As used herein, the characteristic spacing of a particular feature refers to the shortest distance between the external surface of the feature and the external surface of that feature's nearest neighbor. For example, referring to FIG. 2A, the characteristic spacing of feature 106d is 204, the shortest distance between the external surface of feature 106d and the external surface of feature 106c. For a plurality of features, the average characteristic spacing refers to the number average of the characteristic spacings of the individual features.

According to some embodiments, the average characteristic spacing between the milliscale features, when present, is at least 100 micrometers, at least 500 micrometers, at least 1 millimeter, at least 3 millimeters, at least 5 millimeters, or at least 9 millimeters. According to certain embodiments, the average characteristic spacing between the milliscale features, when present, is less than or equal to 10 millimeters, less than or equal to 5 millimeters, less than or equal to 3 millimeters, less than or equal to 1 millimeter, least than or equal to 500 micrometers, or less than or equal to 200 micrometers. Combinations of these ranges are also possible (e.g., from 200 micrometers to 3 millimeters, from 500 micrometers to 5 millimeters, from 1 millimeter to 10 millimeters).

According to some embodiments, the average characteristic spacing between the microscale features, when present, is at least 1 micrometer, at least 5 micrometers, at least 10 micrometers, at least 30 micrometers, at least 50 micrometers, or at least 90 micrometers. According to some embodiments, the average characteristic spacing between the microscale features is less than or equal to 500 micrometers, less than or equal to 200 micrometers, less than or equal to 100 micrometers, less than or equal to 90 micrometers, less than or equal to 70 micrometers, less than or equal to 50 micrometers, less than or equal to 30 micrometers, less than or equal to 10 micrometers, or less than or equal to 5 micrometers. Combinations of these ranges are also possible (e.g., from 1 micrometer to 5 micrometers, from 5 micrometers to 10 micrometers, from 10 micrometers to 30 micrometers, from 30 micrometers to 50 micrometers, from 50 micrometers to 70 micrometers, from 70 micrometers to 90 micrometers, or from 90 micrometers to 100 micrometers).

According to some embodiments, the average characteristic spacing between the nanoscale features, when present, is at least 1 nm, at least 10 nm, at least 50 nm, at least 100 nm, at least 200 nm, at least 300 nm, at least 500 nm, or at least 700 nm. According to some embodiments, the average characteristic spacing between the nanoscale features, when present, is less than or equal to 1 micrometer, less than or equal to 700 nm, less than or equal to 500 nm, less than or equal to 300 nm, less than or equal to 200 nm, less than or equal to 100 nm, less than or equal to 50 nm, or less than or equal to 10 nm. Combinations of these ranges are also possible (e.g., from 1 nm to 100 nm, from 100 nm to 200 nm, from 200 nm to 300 nm, from 300 nm to 500 nm, from 500 nm to 700 nm, or from 700 nm to 1 micrometer).

According to certain embodiments, the features may be relatively regularly spaced across the surface. This may be achieved, for example, by spacing the features in a pattern. In some embodiments, the standard deviation of the nearest neighbor distances of the features on the surface is less than 20% (or less than 10%, or less than 5%, or less than 2%, or less than 1%) of the number average of the nearest neighbor distances of the features on the surface. This standard deviation can be determined by determining, for each feature, the nearest neighbor distance and comparing the standard deviation of those nearest neighbor distances to the number average of those nearest neighbor distances.

According to some embodiments, the features on the surface can include a combination of features of different characteristic lengths. Without wishing to be bound by any particular theory, it is believed that the use of surfaces having such combinations of features can, according to certain embodiments, reduce the amount of time required to remove gas from within bubbles that impinge on the surface. (See, for example, the experiments described in Example 3.) According to certain embodiments, the surface comprises both milliscale features and microscale features. In some embodiments, the surface comprises both microscale features and nanoscale features. In certain embodiments, the surface comprises both milliscale features and nanoscale features. According to some embodiments, the surface comprises milliscale features, microscale features, and nanoscale features.

As noted above, according to certain embodiments, the surface is partially submerged in the bubble-containing liquid. For example, as shown in FIG. 1C, surface 104 is partially submerged in bubble-containing liquid 102 because part of surface 104 is contained within bubble-containing liquid 102 and part of surface 104 is outside bubble-containing liquid 102.

As used herein, the term "submerged surface" is used to refer to a surface that is partially submerged or completely submerged (e.g., into a bubble-containing liquid and/or a foam). The term "partially submerged surface" is used to refer to a surface that is partially but not completely submerged (e.g., into a bubble-containing liquid and/or a foam). The term "completely submerged surface" is used to refer to a surface that is completely and not partially submerged (e.g., into a bubble-containing liquid and/or a foam).

In some embodiments, the surface is submerged in the bubble-containing liquid at a particular tilt angle. The "tilt angle," as used herein, refers to the angle between the submerged surface and the interface between the bubble-containing liquid and the environment outside the bubble-containing liquid. For example, referring to FIG. 1C, surface 104 is partially submerged in bubble-containing liquid 102 at tilt angle 128 (i.e., the angle that surface 104 makes with the interface between bubble containing liquid 102 and gaseous environment 122). Adjusting the tilt angle of the submerged surface can, according to certain embodiments, control the rate at which bubbles from the bubble-containing liquid interact with the surface and/or control the flow rate at which gas is removed from the bubble-containing liquid. In certain embodiments, the surface is submerged in the bubble-containing liquid at a 10° to 15° tilt angle, a 15° to 20° tilt angle, a 20° to 30° tilt angle, a 30° to 40° tilt angle, a 40° to 50° tilt angle, a 50° to 60° tilt angle, a 60° to 70° tilt angle, a 80° to 90° tilt angle. Combinations of the above ranges are also possible (e.g., 20° to 50° tilt angle or 50° to 90° tilt angle).

The surface can be made of a variety of materials. According to certain embodiments, at least a portion of the surface (e.g., at least 10%, at least 25%, at least 50%, at least 75%, at least 90%, or at least 99% of the surface area of the surface) is made of metal(s), semiconductor(s), polymer(s) (e.g., organic polymer(s)), ceramic(s), and/or combinations thereof.

In certain embodiments, the substrate and the features (e.g., the milliscale, microscale, and/or nanoscale features) are made of the same material. For example, in some embodiments, the features can be formed by etching portions of the substrate to leave behind non-etched substrate portions that form the features.

In some embodiments, the surface comprises chemically modified features, a coated surface, or a surface with a bonded monolayer.

In some further embodiments, the surface features define at least one member selected from the group consisting of pores, cavities, wells, interconnected cores, and interconnected cavities.

The submerged surface (e.g., comprising features) can have a variety of suitable geometric surface areas. The term "geometric surface area" refers to the area that would be measured macroscopically (for example, without counting contributions from pores, small-scale roughness, etc.) and can generally be understood as the total projected area. According to certain embodiments, the surface has a geometric surface area of at least 0.1 cm$^2$, at least 1 cm$^2$, at least 10 cm$^2$, at least 100 cm$^2$, at least 1000 cm$^2$, at least 10,000 cm$^2$, at least 100,000 cm$^2$, or at least 1,000,000 cm$^2$.

According to certain embodiments, the features (e.g., the milliscale, microscale, and/or nanoscale features) of the surface are distributed over a geometric surface area of at least 0.1 cm$^2$, at least 1 cm$^2$, at least 10 cm$^2$, at least 100 cm$^2$, at least 1000 cm$^2$, or at least 10,000 cm$^2$.

In accordance with some embodiments, at least 10%, at least 25%, at least 50%, at least 75%, or at least 90% of the geometric surface area of the surface is submerged into the bubble-containing liquid. In some embodiments, at least 10%, at least 25%, at least 50%, at least 75%, or at least 90% of the geometric surface area of the surface is submerged into the foam.

In accordance with some embodiments, at least 10%, at least 25%, at least 50%, at least 75%, or at least 90% of the geometric surface area over which the features (e.g., the milliscale, microscale, and/or nanoscale features) are distributed is submerged into the bubble-containing liquid. In accordance with some embodiments, at least 10%, at least 25%, at least 50%, at least 75%, or at least 90% of the geometric surface area over which the features (e.g., the milliscale, microscale, and/or nanoscale features) are distributed is submerged into the foam.

According to certain embodiments, the features (e.g., the milliscale, microscale, and/or nanoscale features) are distributed over the substrate such that the features occupy a particular solid fraction. The term "solid fraction" (also referred to as ϕ), as used herein, refers to the area fraction of the substrate that would be in direct contact with the liquid when submerged in the liquid. The solid fraction can be calculated by dividing the areas of the tops of the features that would be in contact with the liquid by the geometric surface area over which those features are distributed. For example, referring to FIG. 2C, when article 200 is submerged into the liquid (as shown, for example, in FIG. 1A), the tops of features 106 are in contact with the liquid, while the rest of the surface over which the features are distributed is not. In the set of embodiments illustrated by FIG. 2C, each of features 106 have identical side lengths a and identical nearest neighbor spacings b. Accordingly, the surface solid fraction (ϕ) occupied by the features in FIG. 2C would be calculated as follows:

$$\phi = a^2/(a+b)^2$$

In some embodiments, the surface comprising the features (e.g., the milliscale, microscale, and/or nanoscale features) has any suitable surface roughness. The surface roughness is defined as the total surface area of the sample (including features, holes, etc.) divided by the geometric surface area. Thus, for the case of regularly-distributed square posts (as shown in FIG. 2C) the roughness would be:

$$r = 1 + 4ah/(a+b)^2$$

where h is the height of the post. In some embodiments, the surface has a surface roughness of greater than 1.

According to certain embodiments, the surface is configured such that the surface and the liquid of the foam and/or bubble-containing liquid satisfy the following relationship:

$$\frac{(1-\phi)}{(r-\phi)} < -\cos\theta$$

wherein ϕ is the solid fraction of the surface, r is the roughness of the surface, and θ is the contact angle that would be made between a hypothetical surface without the milliscale, microscale, and/or nanoscale features and a droplet of the liquid of the foam and/or the bubble-containing liquid. According to certain embodiments, the above relationship is the condition for a hydrophobic surface to sustain a plastron layer when submerged into a liquid.

The liquid phase of the bubble-containing liquid (e.g., liquid phase 120 in FIGS. 1A-1C) can have a variety of suitable compositions. In certain embodiments, the bubble-containing liquid comprises water. In some embodiments, the bubble-containing liquid comprises an aqueous solution. According to certain embodiments, the bubble-containing liquid comprises oil, organic solvent(s), and/or blood. In certain embodiments, the bubble-containing liquid is a cell culture medium (e.g., Dulbecco's Modified Eagle Medium/

Nutrient Mixture F-12-DMEM/F-12, and/or Buffered Glycerol-complex Medium/BMGY). Combinations of these liquids are also possible.

The source of bubbles may be any of a variety of suitable sources. According to certain embodiments, the source of bubbles is a conduit. For example, referring to FIG. 1A, system 100 comprises source 118 of bubbles (which is a conduit) that acts as the source of submerged bubbles 114 and layer bubble 116. In some such embodiments, the conduit is or is part of a sparger, a needle, a channel, a duct, a pipe, a tube, and/or a gutter.

According to some further embodiments, the source of bubbles is a chemical reaction (e.g., a gas evolution reaction, such as an acid-base reaction). For example, referring to FIG. 1B, system 100 can comprise a chemical reaction as a source of submerged bubbles 114 (and/or layer bubble(s), if present). According to some embodiments, the product of the chemical reaction may be gaseous hydrocarbons such as gaseous alkanes (e.g., methane ($CH_4$), ethane ($C_2H_6$), propane ($C_3H_8$), butane ($C_4H_{10}$), etc.), $N_2$, $O_2$, CO, He, $H_2$, $CO_2$, Ar, and/or combinations of two or more of these.

According to certain embodiments, the source of bubbles may be present in solution prior to submerging the surface into the bubble-containing liquid. For example, the surface can be placed in a region where a layer of bubbles has already agglomerated (e.g., to form foam). In certain other embodiments, the source of bubbles may be added to the solution after the surface is already present in the liquid (e.g., gas flows through a sparger present in a liquid after the surface is already present).

According to certain embodiments, the surface can be used to eliminate bubbles (e.g., from a foam and/or a bubble containing liquid) at a relatively high rate. For example, in some embodiments, bubbles are eliminated at a rate of at least 10 bubbles per hour, at least 100 bubbles per hour, at least 1000 bubbles per hour, at least 10,000 bubbles per hour, or at least 100,000 bubbles per hour.

According to certain embodiments, the gas from within the bubbles comprises a first gas. The first gas within the bubbles can have any of a variety of suitable compositions. For example, in some embodiments, the gas within the bubbles comprises gaseous hydrocarbons such as gaseous alkanes (e.g., methane ($CH_4$), ethane ($C_2H_6$), propane ($C_3H_8$), butane ($C_4H_{10}$), etc.), $N_2$, $O_2$, CO, He, $H_2$, $CO_2$, Ar, and/or combinations of two or more of these.

According to certain embodiments, the gaseous environment comprises a second gas. The gaseous environment can contain any of a variety of suitable gases. According to certain embodiments, the gaseous environment comprises gaseous hydrocarbons such as gaseous alkanes (e.g., methane ($CH_4$), ethane ($C_2H_6$), propane ($C_3H_8$), butane ($C_4H_{10}$), etc.), $N_2$, $O_2$, CO, He, $H_2$, $CO_2$, Ar, and/or combinations of two or more of these (e.g., air, which is a combination of, primarily, $N_2$ and $O_2$). In certain, although not necessarily all embodiments, it can be advantageous to employ a gaseous environment that comprises air.

According to certain embodiments, the first gas (within the bubbles) and the second gas (of the gaseous environment) have essentially the same chemical composition. As used herein, two gases are said to have "essentially the same chemical composition" when at least 90% of the volumes of the gases are made up of the same chemicals.

According to some embodiments, the first gas and the second gas have different chemical compositions. As used herein, two gases are said to have "different chemical compositions" if they do not have essentially the same chemical composition.

In some embodiments, the bubble-containing liquid contains an additive. As used herein, "additive" is used to refer to anything in the bubble-containing liquid that is not the liquid, bubbles (or foam), or the surface being submerged into the bubble-containing liquid. In some embodiments, the additive comprises proteins, surfactants, and/or salts (e.g., alkali-metal salts). In certain embodiments, the bubble-containing liquid comprises an additive to prevent or reduce evaporation of the bubble-containing liquid. For example, in certain embodiments in which biochemical reactions are performed in the bubble-containing liquid, biological substances (e.g., proteins) can be used as an additive, which can stabilize the bubbles until a layer of foam is created. Other additives that can be used include, but are not limited to, sodium bicarbonate, sodium alkylbenzene sulfonate, sodium tripolyphosphate, tetrasodium pyrophosphate, and/or sodium carbonate. In some embodiments, the additive comprises a surfactant, such as a non-ionic surfactant. Non-limiting examples of water-soluble surfactants that may be present include those sold under the Tween® brand (also known as Polysorbate), such as Tween® 20, Tween® 40, Tween® 60, Tween® 80, Tween® 21, Tween® 61, Tween® 81, Tween® 65, and Tween® 85. Non-limiting examples of oil-soluble surfactants that may be present include those sold under the Span® brand, such as Span® 20, Span® 40, Span® 60, Span® 80, Span® 65, and Span® 85. For instance, referring to FIG. 1A and according to some embodiments, system 100 includes additive 130 in bubble-containing liquid 102. It should be understood that the use of additives is optional, and in some embodiments, additives are not included in the bubble-containing liquid.

The articles, systems, and methods described herein can generally be used in a variety of applications. According to certain embodiments, articles, systems, and/or methods described herein can be used to reduce and/or eliminate foam formed as a by-product of a manufacturing processes. According to certain embodiments, articles, systems, and/or methods described herein can be used to reduce and/or eliminate foam formed as a by-product of a paper manufacturing process, a water treatment process, a food and/or beverage manufacturing process, and/or an agrochemical manufacturing process. In some embodiments, articles, systems, and/or methods described herein can be used to reduce and/or eliminate foam from a coating process (e.g., to reduce and/or eliminate foams that create defects in a coating layer). According to certain embodiments, articles, systems, and/or methods described herein can be used to reduce and/or eliminate foam in a biochemical processes. This can be advantageous, in certain cases, because active ingredients (such as proteins) can become entrapped within foams such that they are no longer usable for the biochemical reaction. Also, in some biochemical processes in which bubbles carry gas which is essential to the biochemical reaction, those bubbles agglomerate within a separate foam layer and grow (e.g., to the extent that gas diffusion from them to the solution is negligible). Foam can also create inefficiencies through disruption of liquid flow, reduced efficiency of pumps, and/or overflow of reaction tanks.

Figure 5:
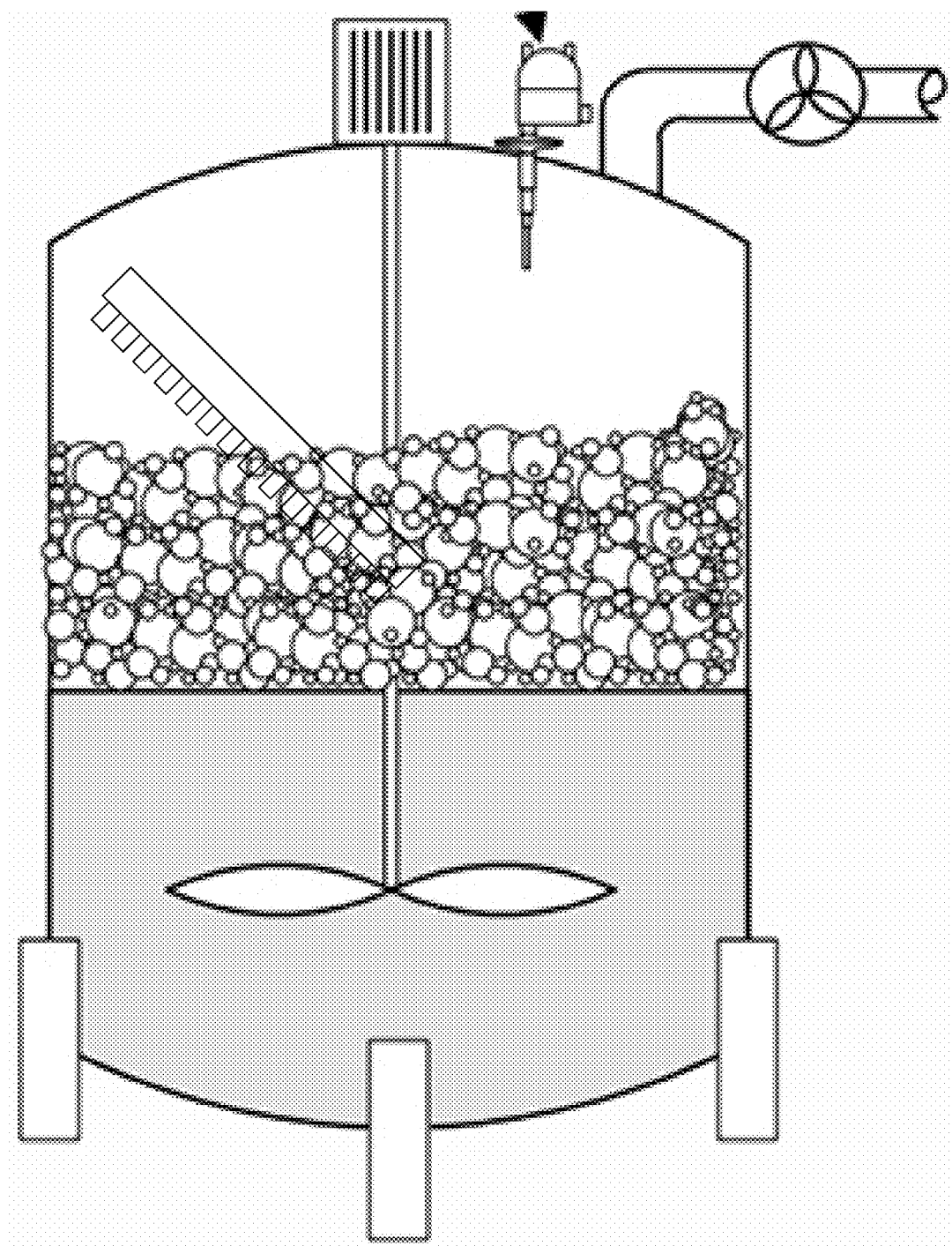
FIG. 5 is an exemplary schematic diagram illustrating a surface that can be used to reduce foaming in a bubble-containing liquid within a bioreactor.

According to certain embodiments, the bubble-containing liquid can be located within a container, a reactor, a bioreactor, a fluidic conduit, or the like. For example, FIG. 5 is an exemplary schematic diagram illustrating a surface that can be used to reduce foam formation in a bubble-containing liquid within a bioreactor.

U.S. Provisional Application No. 62/608,394, filed Dec. 20, 2017, and entitled "Foam Reduction and/or Prevention Methods and Associated Systems and Articles" is incorporated herein by reference in its entirety for all purposes.

The following examples are intended to illustrate certain embodiments of the present invention, but do not exemplify the full scope of the invention.

Example 1

Figure 7A:
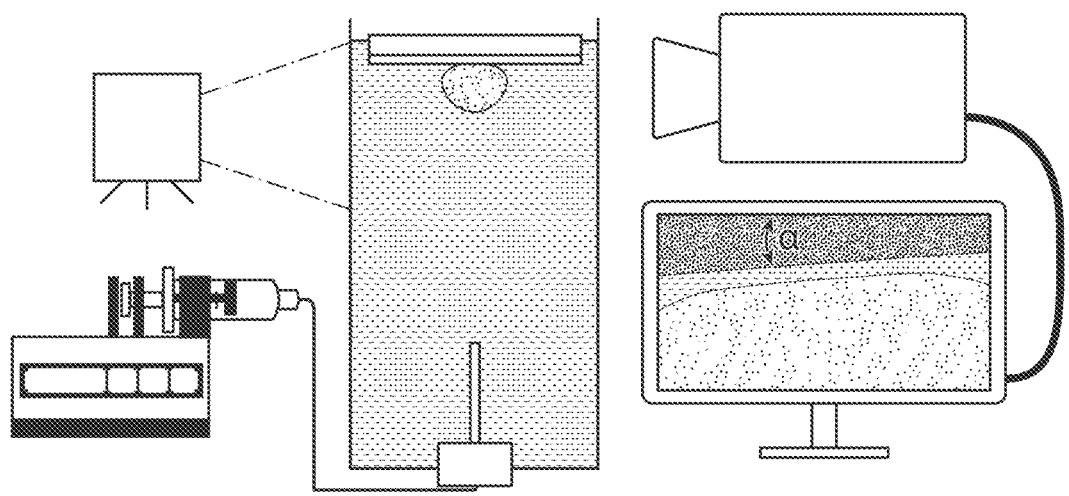
FIG. 7A is a schematic illustration of an experimental setup, according to certain embodiments.

In this example, bubble impact experiments were conducted using a submerged 30 gauge needle in a column of deionized water (Millipore, resistivity of 18 MΩ-cm). The needle was connected to a syringe pump (Harvard Apparatus Pump 11 Elite) that allowed insertion of air bubbles into the column at a controlled rate of 15 µL/min which generated uniform sized bubbles of approximately 2 mm in diameter. The needle was located 20 mm away from a silicon sample tilted at an angle of 17° such that a part of the sample was located above the water level in an ambient environment (25° C., 1 atm), while the region of impact was still submerged. Bubble impact was recorded at a rate of 1000 frames/s using a high speed camera (Photron SA1.1) and a high magnification lens (Navitar 12× Zoom lens with a 2.0× Tamron teleconverter). The impact region was illuminated using a Zaila light source. An illustration of the setup is shown in FIG. 7A.

The samples used in the experiments were square 1" silicon samples that were etched and chemically modified to change their wetting properties.

Figure 7B:
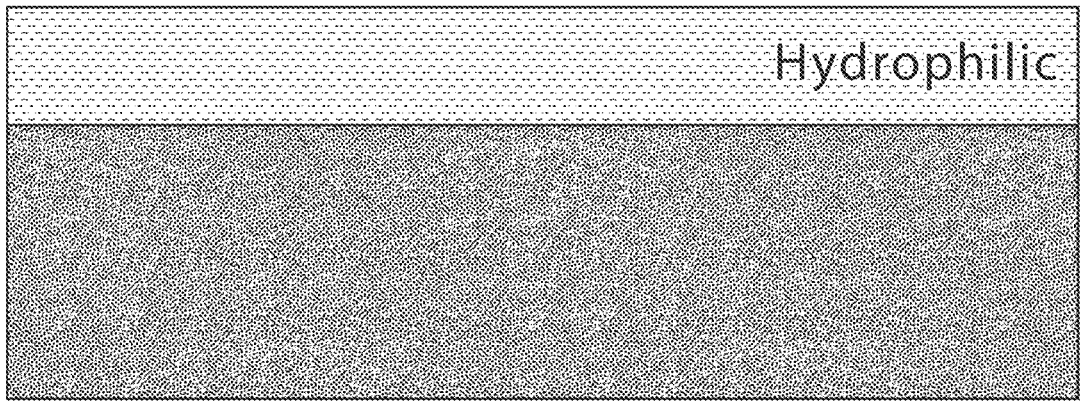
FIG. 7B is a schematic illustration of an exemplary hydrophilic surface sample.

The hydrophilic sample illustrated schematically in FIG. 7B was prepared by cleaning a plain silicon sample under oxygen plasma (Harrick Plasma Expanded Plasma Cleaner PDC-001) for 20 minutes.

Figure 7C:
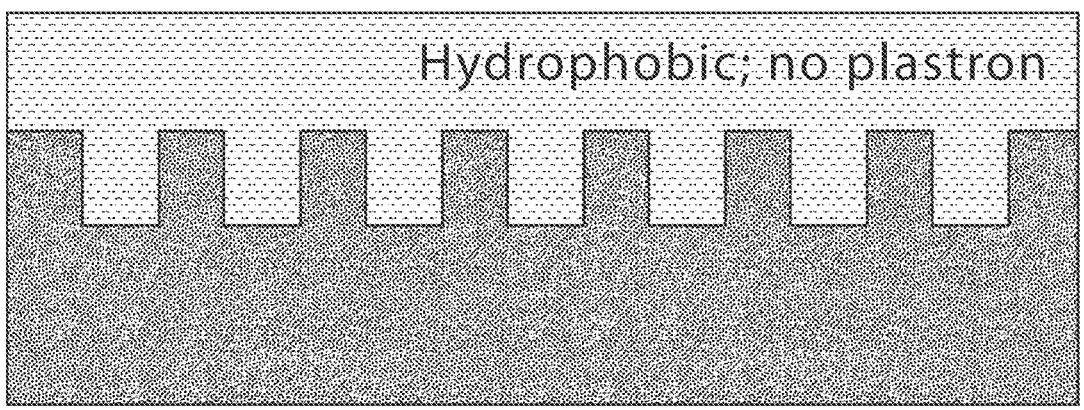
FIG. 7C is a schematic illustration of an exemplary textured surface interacting with a liquid such that no plastron layer is formed.

The hydrophobic sample illustrated schematically in FIG. 7C (which did not sustain a plastron layer when submerged) was textured by photolithography and it was composed of square posts of size 10 µm and depth of 11 µm distanced 50 µm from one another. After the textures were etched, the surface was chemically modified using trichloro(1H,1H,2H, 2H-perfluorooctyl)silane (fluorosilane) that was purchased from Sigma Aldrich to render it hydrophobic.

Figure 7D:
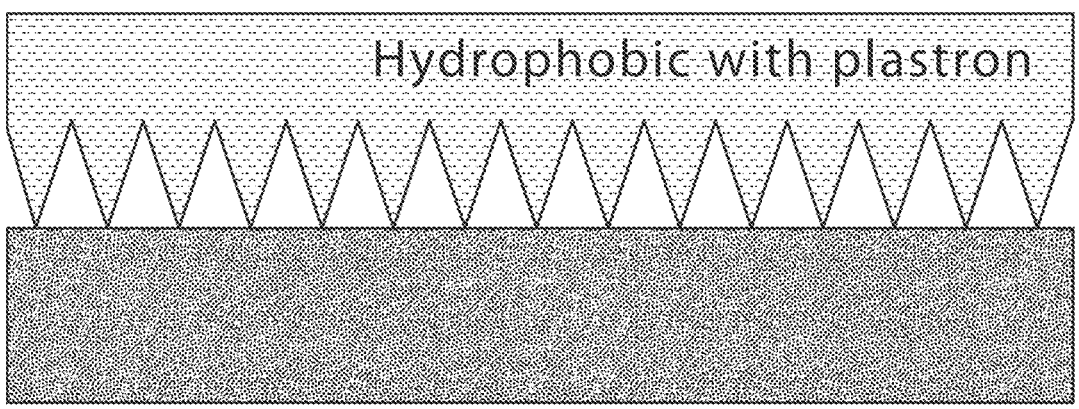
FIG. 7D is a schematic illustration of an exemplary textured surface interacting with a liquid such that a plastron layer is formed.

The features of the hydrophobic sample that sustained a plastron layer when submerged (shown schematically in FIG. 7D) were created using laser ablation (Tykma Electrox Scorpion Rapide, 20 W). The features were closely packed pyramids with square base of 50 µm and height of 50 µm, with sub-micrometric spherical structures on the faces of the pyramids. After the pyramidal structures were etched, the surface was also coated with fluorosilane.

Figure 7E:
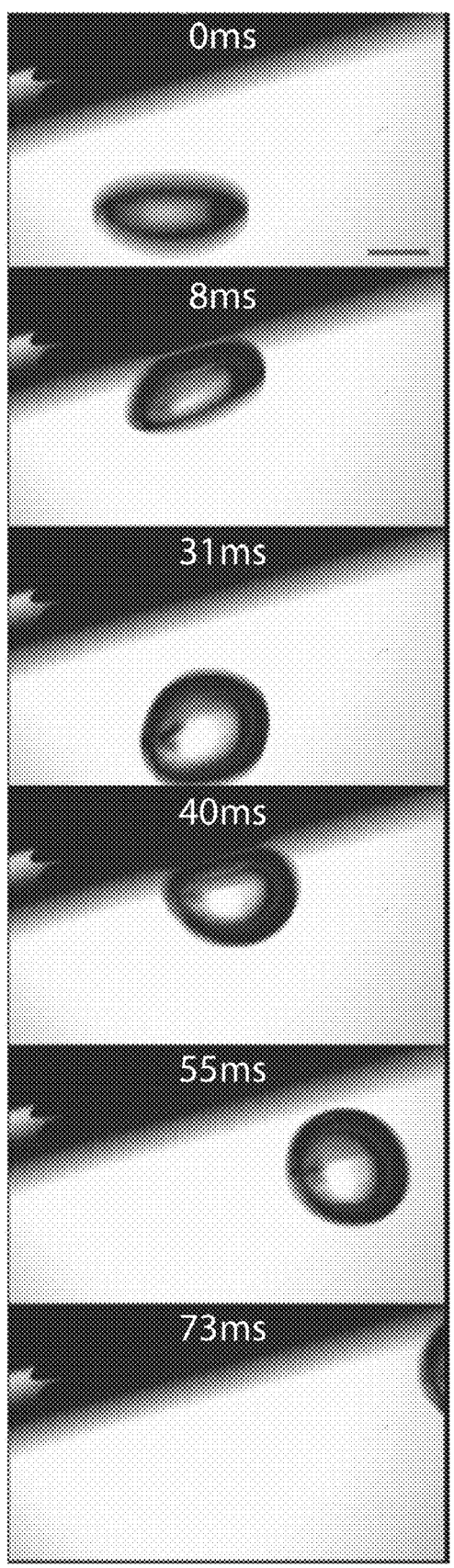
FIG. 7E is a sequence of images showing an exemplary interaction between a bubble and a hydrophilic surface.

As can be seen from the image sequence shown in FIG. 7E, when a bubble impacted the hydrophilic surface, it bounced on the surface without adhering to it. Without wishing to be bound by any particular theory, it is believed that this was due to the fact that it is energetically favorable for the surface to be in contact with liquid. Thus, when this type of surface was partially submerged into a foamy liquid, the bubble continued to rise directly to the surface and contributed to the foamy layer.

Figure 7F:
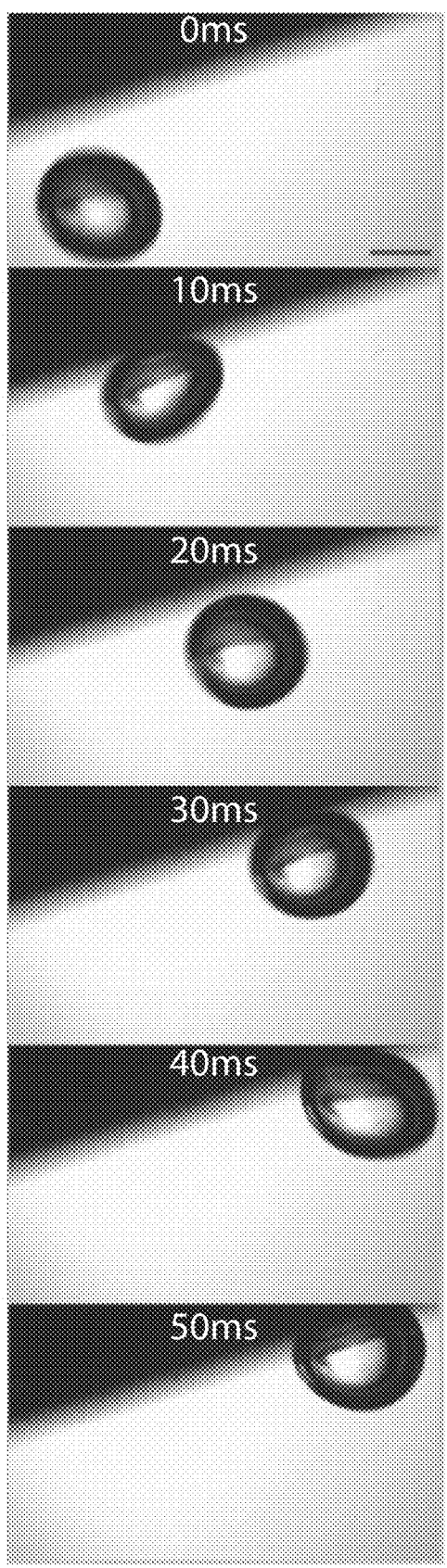
FIG. 7F is a sequence of images showing an exemplary interaction between a bubble and a hydrophobic surface.

On the other hand, when a bubble came into contact with a hydrophobic surface, it eventually adhered to the surface as it was believed to have been more energetically favorable for the surface to be in contact with the gas inside the bubble, as can be seen in the image sequence in FIG. 7F. However, when the surface could not sustain a plastron layer (as shown in FIG. 7F, and as shown schematically in FIG. 7C), the air within the bubble could not spread on the surface and it stayed pinned to the surface. In this case, the bubble generally moved only when it coalesced with other bubbles to become large enough to overcome the pinning forces.

Figure 7G:
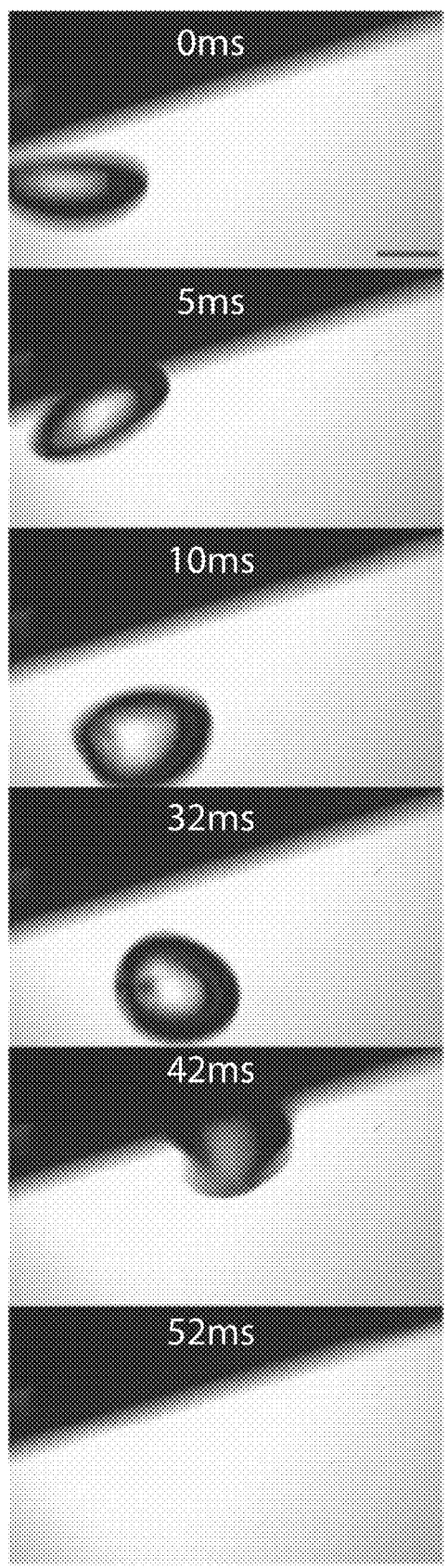
FIG. 7G is a sequence of images showing an exemplary interaction between a bubble and a surface that sustains a plastron layer.

Lastly, when a bubble impacted a surface that was able to sustain a plastron layer, as seen in FIG. 7G, the bubble broke and it was completely absorbed by the surface. Without wishing to be bound by any particular theory, it is believed that it was, in this instance, more energetically favorable for the surface to be completely covered by the gas within the bubble, leading to the merging of the gas within the bubble into the plastron layer. Moreover, because part of the surface was not submerged and the plastron layer was continuous on the surface, the absorbed gas traveled through the plastron layer until it was released to the outer environment, such that the bubble did not contribute to the foam layer.

All scale bars in FIGS. 7E-7G represent 1 mm.

Example 2

Figure 8A:
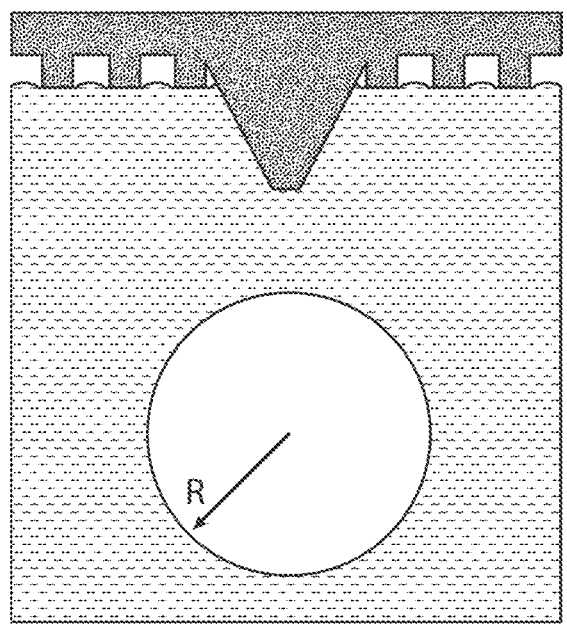
FIG. 8A is a schematic illustration of a bubble in a liquid in contact with a surface, on which a plastron layer is being sustained, in accordance with certain embodiments.
Figure 8B:
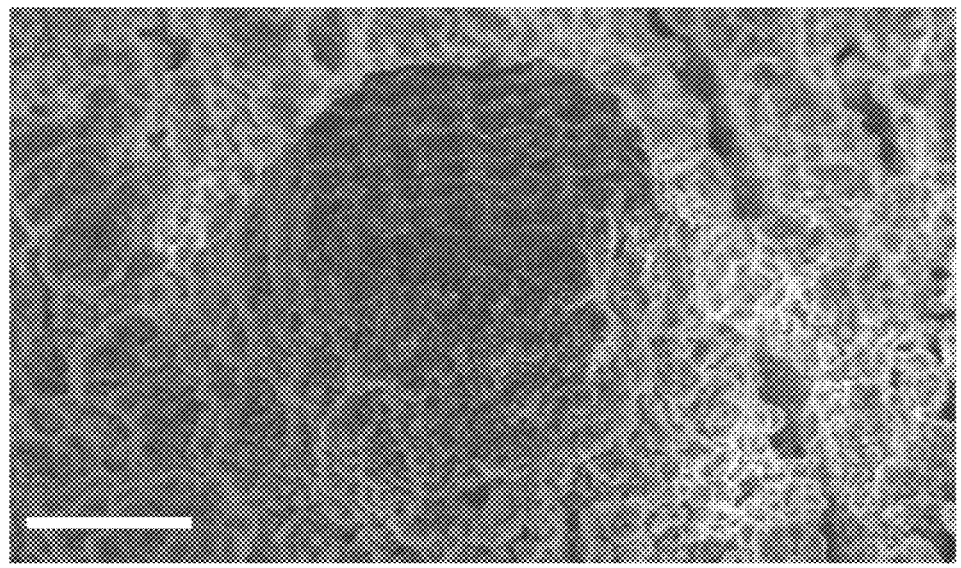
FIG. 8B is an SEM image of an exemplary spike on a surface.
Figure 8C:
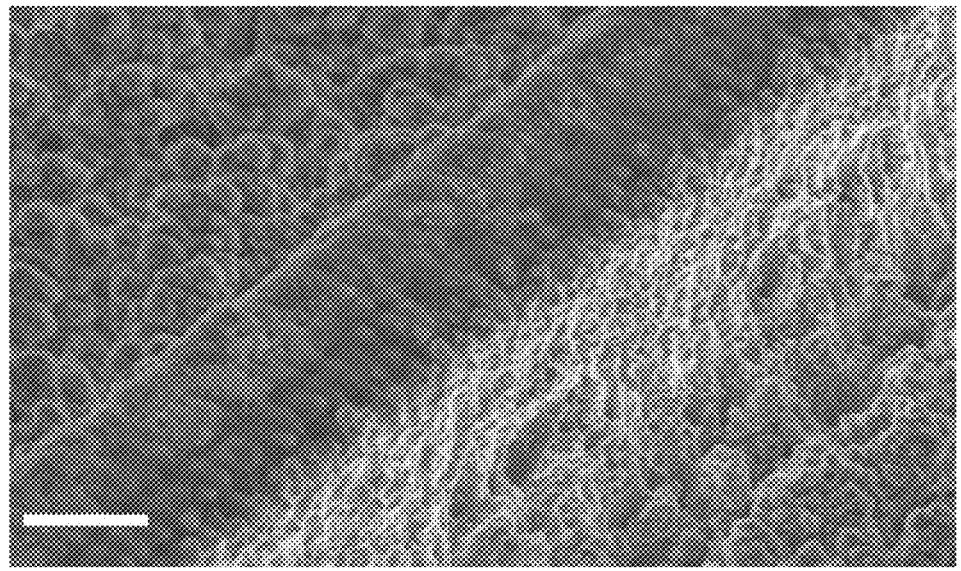
FIG. 8C is an SEM image of an exemplary ridge on a surface.

This example demonstrates the enhanced bubble capturing ability of plastron sustaining hydrophobic surfaces by adding sub-milliscale features that help to break the thin liquid film separating the bubble and the plastron layer. A schematic illustration of such a surface is shown in FIG. 8A. In this example, two types of sub-milliscale features were used: a trapezoidal spike of height of 252 µm having a circular top face 200 µm in diameter, and a square ridge having a height of 308 µm and a width of 162 µm. These regions were characterized using an SEM (JSM-6610LV) at an accelerating voltage of 20 kV. Images of the spike and the ridge can be seen in FIG. 8B and FIG. 8C, respectively.

The experimental set up used in this Example 2 were similar to those presented in Example 1. In this example, however, the samples were not tilted (i.e., the tilt angle was) 0°, and a 20 gauge needle was connected to the syringe pump which produced uniform bubbles of 3.2 mm in diameter.

Figure 8D:
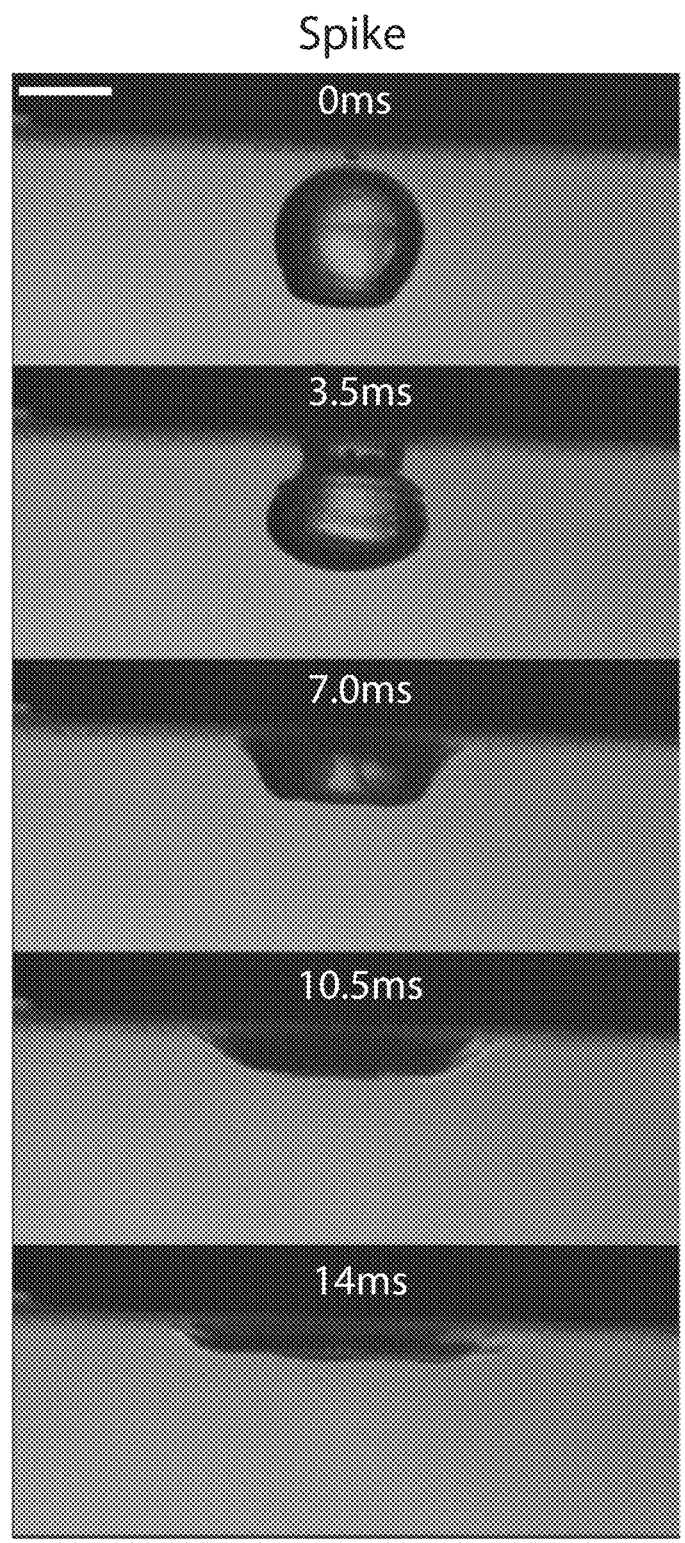
FIG. 8D is a sequence of images showing the interaction of a bubble with a surface comprising a plurality of spikes, in accordance with certain embodiments.
Figure 8E:
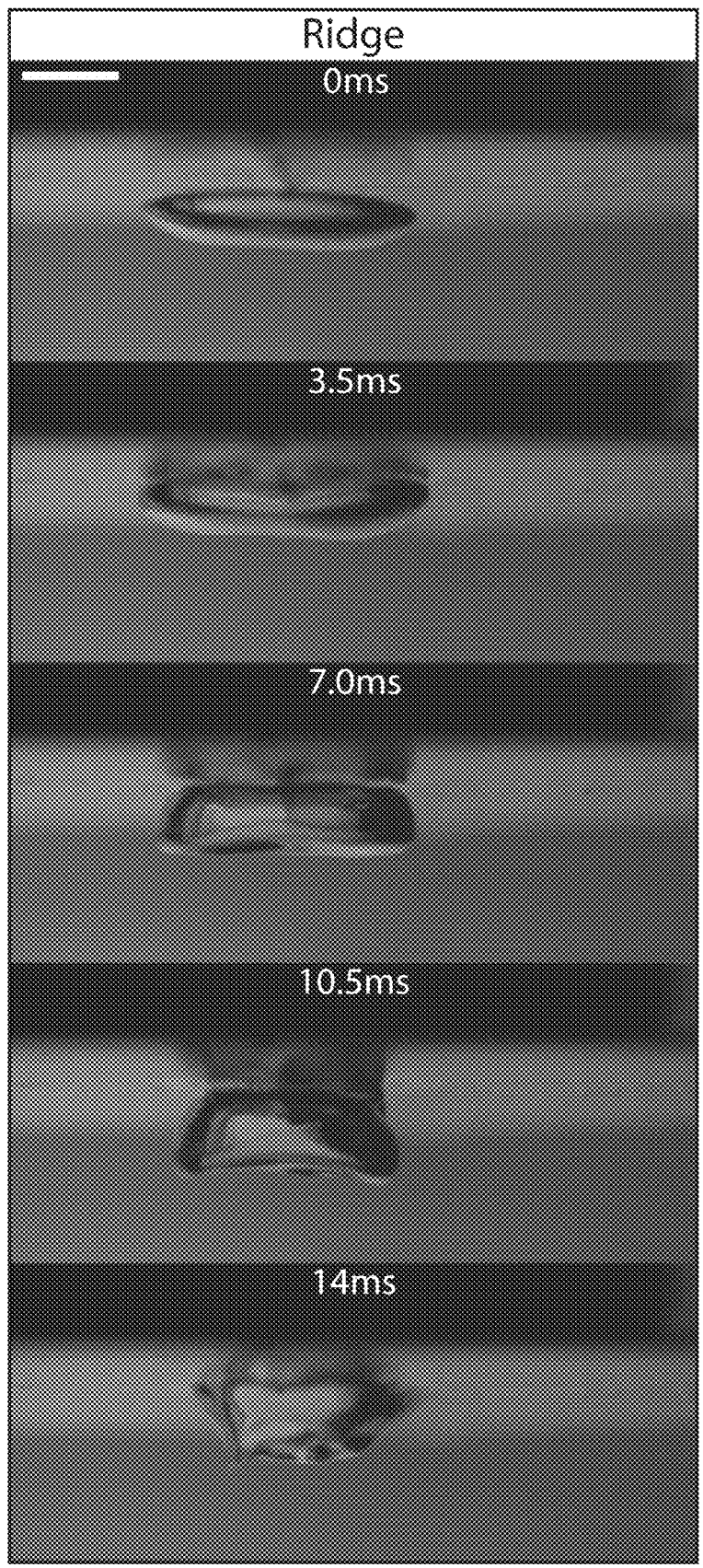
FIG. 8E is a sequence of images showing the interaction of a bubble with a surface comprising a plurality of ridges, in accordance with certain embodiments.

As can be seen in the image sequence in FIG. 8D, as the bubble impacted the surface that had a sub-milliscale spike, the thin liquid film drained preferentially on the area between the spike and the bubble. Once the liquid film was drained, the bubble ruptured and its contents were evacuated into the plastron layer. Similarly, when a bubble impacted the surface that contained a ridge, the thin liquid film between the bubble and the plastron broke near the ridge and the content of the bubble was evacuated into the plastron, as seen in FIG. 8E. The time it took for the thin liquid film to drain on the samples described in this Example 2 (a few microseconds) was an order of magnitude lower than the time it took for the liquid film to drain on a plastron containing hydrophobic samples of Example 1 (tens of microseconds) which did not have these features.

Example 3

Figure 9A:
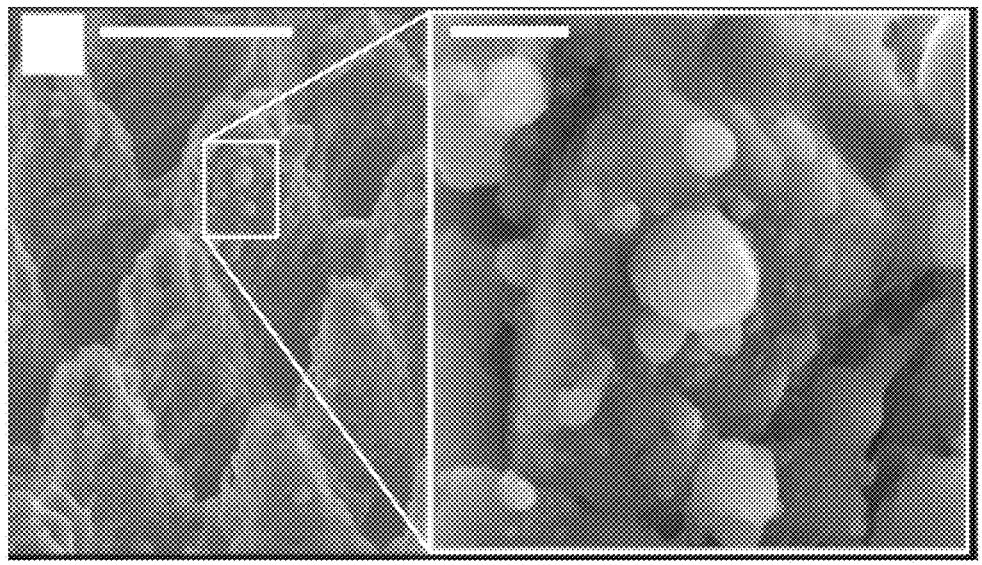
FIG. 9A is a set of SEM images of an exemplary textured surface.
Figure 9B:
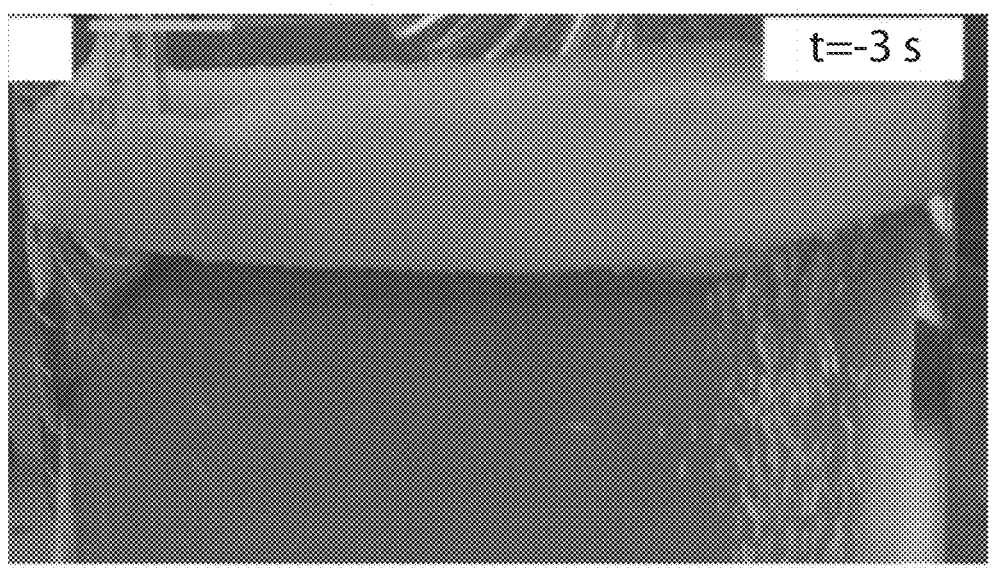
FIG. 9B is an image of an exemplary foam layer formed over a liquid, 3 seconds before the surface is partially submerged into the liquid.
Figure 9C:
FIG. 9C is an image of an exemplary foam layer formed over a liquid at a point in time at which the surface shown in FIG. 9A is partially submerged into the foam and the liquid.
Figure 9D:
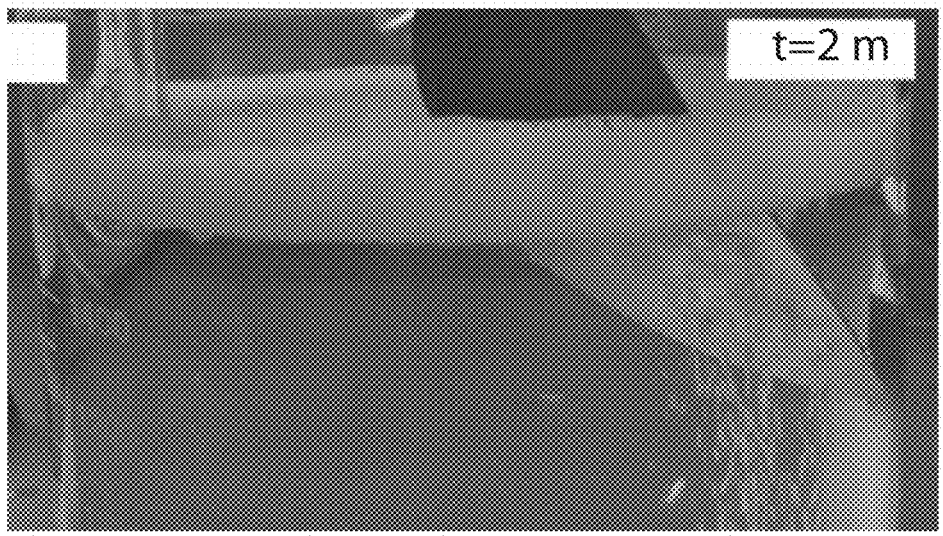
FIG. 9D is an image of an exemplary foam layer formed over a liquid 2 minutes after the surface shown in FIG. 9A has been partially submerged into the foam and the liquid.
Figure 9E:
FIG. 9E is an image of an exemplary foam layer formed over a liquid 4 minutes after the surface shown in FIG. 9A has been partially submerged into the foam and the liquid.
Figure 9F:
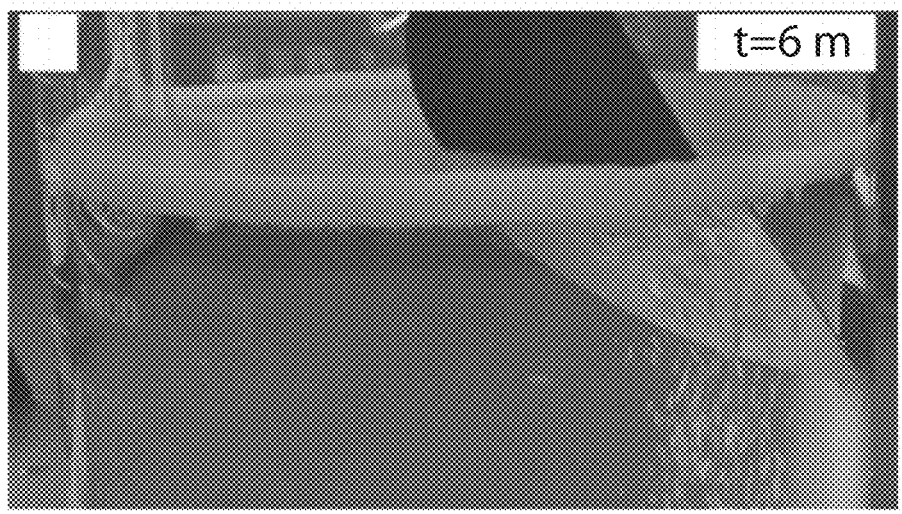
FIG. 9F is an image of an exemplary foam layer formed over a liquid 6 minutes after the surface shown in FIG. 9A has been partially submerged into the foam and the liquid.

This example describes the use of hydrophobic surfaces to reduce the volume of a foam. In this example, a hydrophobic surface similar to the one that was described in Example 1 and shown in FIG. 7D and FIG. 7E was placed so that it was partially submerged in a foamy liquid, an aqueous solution with 0.02 wt % Alconox. Air bubbles were introduced into this solution through a metallic sparger with average pore size of 20 µm that was connected to the house air supply. The sample was characterized using SEM (JSM-6610LV) at an accelerating voltage of 20 kV to show its textures as well as the sub-micron features on its faces as seen in FIG. 9A (scale bar 50 µm), and the inset (scale bar 5 µm). Prior to dipping the sample into the beaker, a stable layer resided on the air-liquid interface as seen in FIG. 9B (scale bar is 2 cm). However, when the surface was partially submerged into the solution, the bubbles were absorbed by the plastron layer on the surface so that the gas within the bubbles was translated through this layer to the outer environment. As can be seen in the time-lapse in FIG. 9C through FIG. 9F, in a matter of several minutes, apart from some residual foam that was adhered to the walls of the beaker, the foamy layer was removed completely.

Without wishing to be bound by any particular theory, it is believed that the condition for hydrophobicity, in this instance, can be written in as:

$$0 < -\cos\theta \quad (1.1)$$

Similarly, the condition for a hydrophobic surface to sustain a plastron layer when submerged, in this instance, can be written as:

$$\frac{(1-\phi)}{(r-\phi)} < -\cos\theta \quad (1.2)$$

When $r$ is the roughness of the surface and $\phi$ is the solid fraction. Since both $\phi<1$ and $r>\phi$, then condition (1.2) is more stringent than condition (1.1), and accordingly, it is believed that not every hydrophobic surface will be able to sustain a plastron layer when used in conjunction with an aqueous liquid. On the other hand, it is believed that most or all surfaces that are able to sustain a plastron layer, when used in conjunction with an aqueous liquid, are hydrophobic.

The following table summarizes how surfaces ranked in terms of bubble capturing ability, when used with aqueous solutions, from the ones that were not able to catch bubbles at all to the ones that were able to catch bubbles and then translate the gas within the bubbles in the most efficient way (bottom of the table):

| Surface type | Probability of capturing | Ease of gas translation |
| --- | --- | --- |
| Hydrophilic with textures | Low | No translation |
| Hydrophilic | Low | No translation |
| Hydrophobic without plastron | High | Very low |
| Hydrophobic with plastron, and high solid fraction | Low | Fast |
| Hydrophobic with plastron, and low solid fraction | High | Fast |
| Hydrophobic with plastron, low solid fraction, and macro-textures | Very high | Fast |

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method for transporting gas from bubbles out of a bubble-containing liquid, comprising:
    at least partially submerging a surface into the bubble-containing liquid;
    subsequently allowing bubbles within the bubble-containing liquid to be transported proximate the surface, and allowing gas from within the bubbles to be transported along the surface until the gas from within the bubbles enters a gaseous environment separate from the bubble-containing liquid.

2. The method of claim 1, wherein the surface is non-wetting with respect to the liquid of the bubble-containing liquid.

3. The method of claim 1, wherein at least 10% of the geometric surface area of the surface is submerged into the bubble-containing liquid.

4. The method of claim 1, wherein the surface comprises features.

5. The method of claim 1, wherein the bubbles comprise a gaseous hydrocarbon, $N_2$, $O_2$, CO, He, $H_2$, $CO_2$, Ar, and/or a combination of two or more of these.

6. The method of claim 1, wherein the bubble-containing liquid is located within a bioreactor.

7. The method of claim 1, wherein the bubble-containing liquid comprises a cell culture medium.

8. A system for the reduction or prevention of foam formation, comprising:
    a liquid;
    bubbles and/or a source of bubbles within and/or in fluidic communication with the liquid; and
    a surface at least partially submerged within the liquid;
    wherein the surface is non-wetting with respect to the liquid;
    wherein the surface comprises milliscale features comprising ridges, spikes, and/or posts; and
    wherein the surface comprises (i) nanoscale features comprising ridges, spikes, and/or posts and/or (ii) microscale features comprising ridges, spikes, and/or posts.

9. The system of claim 8, wherein the liquid is located within a bioreactor.

10. The system of claim 8, wherein the liquid comprises a cell culture medium.

11. The system of claim 8, wherein the bubbles comprise a gaseous hydrocarbon, $N_2$, $O_2$, CO, He, $H_2$, $CO_2$, Ar, and/or a combination of two or more of these.

12. The system of claim 8, wherein at least 10% of the geometric surface area of the surface is submerged into the liquid.

13. A system, comprising:
    a surface submerged in a liquid, the surface comprising:
        a plurality of features comprising ridges, spikes, and/or posts; and
        trapped gas positioned between the features such that the trapped gas forms a plastron layer while the surface is submerged in the liquid;
    wherein the plastron layer is configured to interact with gas in the liquid such that the gas in the liquid merges with the plastron layer.

14. The system of claim 13, wherein the surface is non-wetting with respect to the liquid.

15. The system of claim 13, wherein the plurality of features comprises nanoscale features and/or microscale features.

16. The system of claim 13, wherein the gas in the liquid comprises a gaseous hydrocarbon, $N_2$, $O_2$, CO, He, $H_2$, $CO_2$, Ar, and/or a combination of two or more of these.

17. The system of claim 13, wherein the surface is at least partially submerged in the liquid.

18. The system of claim 17, wherein the surface is completely submerged in the liquid.

19. A method, comprising:
    submerging a surface comprising a plurality of features into a liquid, wherein the features comprise ridges, spikes, and/or posts, and wherein, after the submerging, a trapped gas is positioned between the features such that the trapped gas forms a plastron layer; and
    merging a gas in the liquid with the plastron layer.

20. The method of claim 19, wherein the surface is non-wetting with respect to the liquid.

21. The method of claim 19, wherein the plurality of features comprises nanoscale features and/or microscale features.

22. The method of claim 19, wherein the gas in the liquid comprises a gaseous hydrocarbon, $N_2$, $O_2$, CO, He, $H_2$, $CO_2$, Ar, and/or a combination of two or more of these.

23. The method of claim 19, wherein the surface is at least partially submerged in the liquid.

24. The method of claim 23, wherein the surface is completely submerged in the liquid.

* * * * *